United States Patent
Pfoertsch et al.

(10) Patent No.: US 11,726,801 B2
(45) Date of Patent: Aug. 15, 2023

(54) MANAGEMENT OF USER INTERFACE ELEMENTS BASED ON HISTORICAL CONFIGURATION DATA

(71) Applicant: MICROSOFT TECHNOLOGY LICENSING, LLC, Redmond, WA (US)

(72) Inventors: Anna Marion Pfoertsch, Seattle, WA (US); Karina Jennifer Chang, Seattle, WA (US); Evan Russell Koschik, Seattle, WA (US); Bret P. Anderson, Kirkland, WA (US); Clinton Rutkas, Sammamish, WA (US); Alex G. Snitkovskiy, Kirkland, WA (US); Jeffrey Evan Stall, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/222,709

(22) Filed: Apr. 5, 2021

(65) Prior Publication Data
US 2022/0318033 A1    Oct. 6, 2022

(51) Int. Cl.
*G06F 9/451*    (2018.01)

(52) U.S. Cl.
CPC .................... *G06F 9/451* (2018.02)

(58) Field of Classification Search
CPC ...... G06F 9/451; G06F 3/1423; G06F 3/1454; G09G 5/14; G09G 2354/00
See application file for complete search history.

(56) References Cited

U.S. PATENT DOCUMENTS

| 2012/0320075 A1* | 12/2012 | Silk | G06F 3/14 345/581 |
| 2019/0121594 A1* | 4/2019 | Akiyama | H04N 21/47 |
| 2019/0129727 A1* | 5/2019 | Bovet | G06F 9/54 |

FOREIGN PATENT DOCUMENTS

| EP | 2787434 A1 | 10/2014 |
| JP | 2012022699 A | 2/2012 |

OTHER PUBLICATIONS

"International Search Report and Written Opinion Issued in PCT Application No. PCT/US22/020663", dated Jun. 30, 2022, 11 Pages.

* cited by examiner

*Primary Examiner* — Andrey Belousov

(57) ABSTRACT

The present disclosure provides techniques for management of user interface elements based on historical configuration data. Use of historical configuration data to render user interface elements improves usability of graphical user interfaces by maintaining a consistent user experience. The states of user interface objects in a hosting environment are retained as historical configuration data and linked to a hosting environment profile. When the same or similar hosting environment is detected, the user interface elements are rendered based on the historical configuration data. For example, the last positions of windows in a particular monitor topology are stored as historical configuration data linked to that monitor topology. The windows are returned to their previous positions when a computing device is next configured with the same or similar monitor topology.

20 Claims, 16 Drawing Sheets

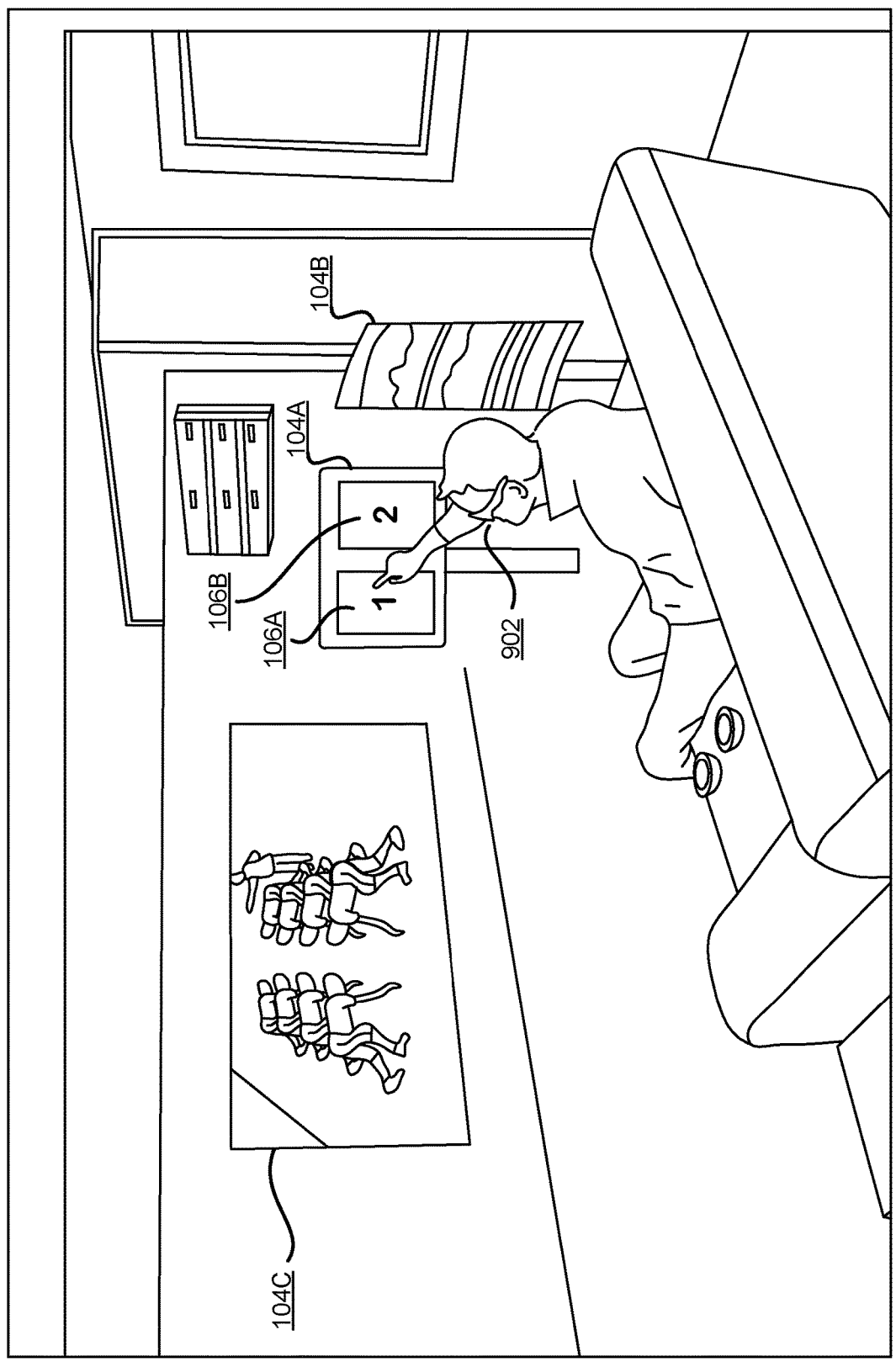

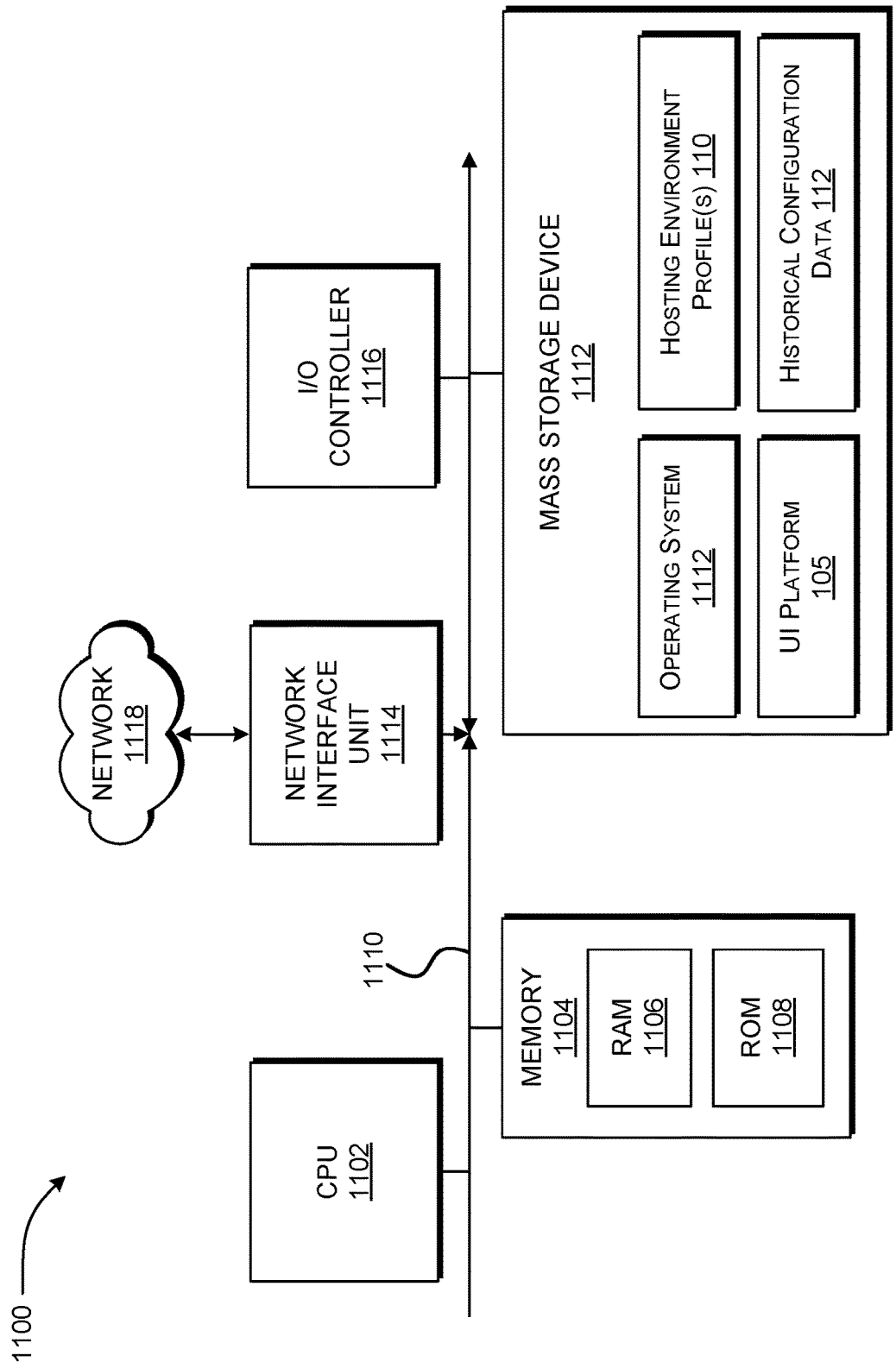

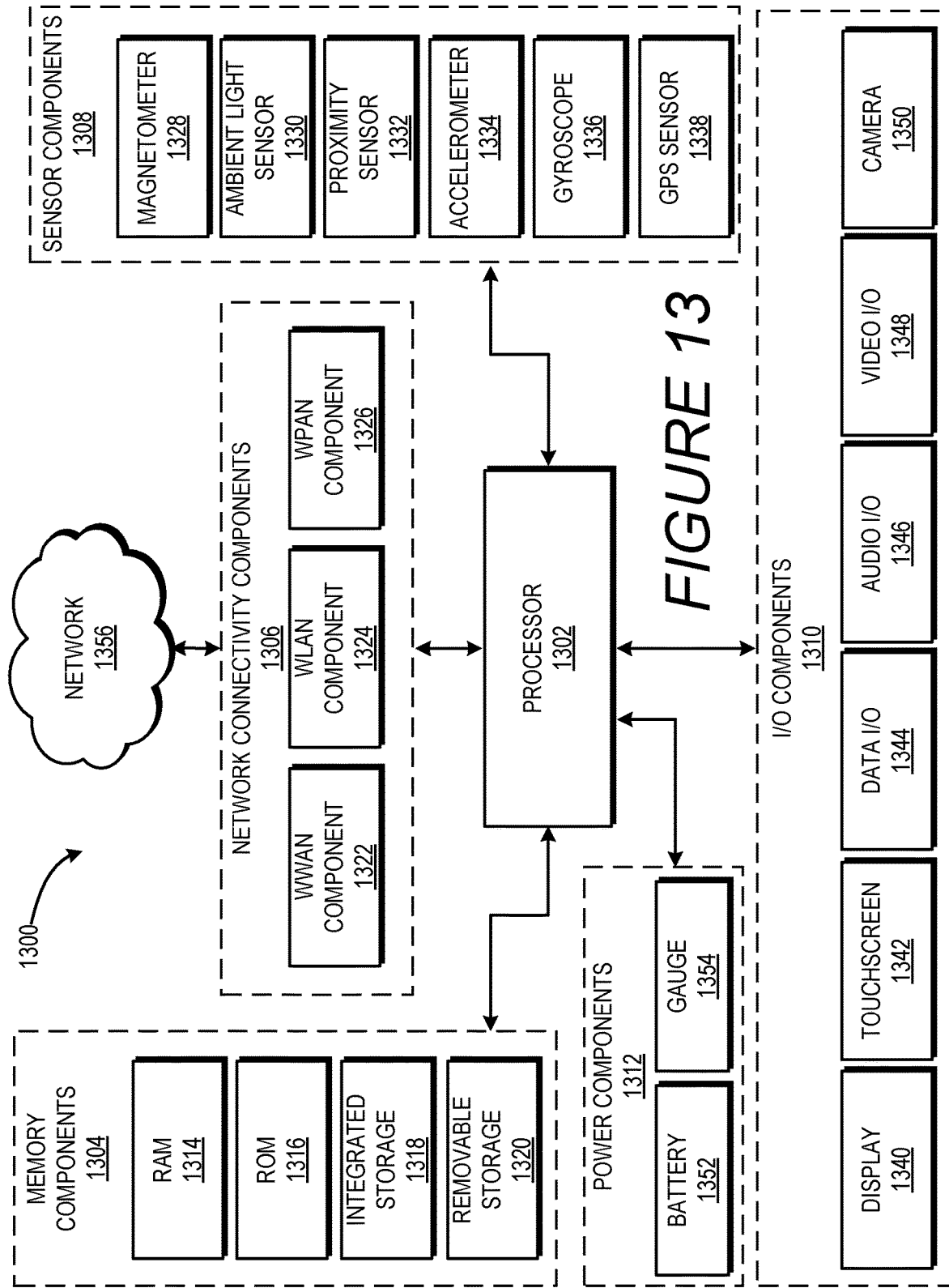

MANAGEMENT OF USER INTERFACE ELEMENTS BASED ON HISTORICAL CONFIGURATION DATA

BACKGROUND

Computing devices are constantly being connected to and disconnected from various display devices. For example, a laptop computer may be docked to external monitors, the screen of a smart phone may be displayed on a television, and virtual reality (VR) or augmented reality (AR) goggles may be connected to a desktop computer. Each of these types of changes affects the graphical user interface (GUI) and may cause modifications to the rendering of windows, icons, menus, and other user interface elements.

When there is a change in the connected display devices, or monitor topology, of a computing device the arrangement and rendering of user interface elements may be changed. Operating systems such as Windows™ from Microsoft Corporation adjust window positions when monitor topologies change. The changes in window positions are directed by a default or a system-defined process. For example, if a monitor is removed from a system any open windows displayed on that monitor are moved to another monitor, minimized, or erroneously moved to an off-screen location.

However, computing devices do not always appropriately arrange windows for a given monitor topology. Some systems may not maintain a historical record of how windows were arranged for a given topology. Also, some systems do not appropriately arrange windows when a computer is connected to a set of display devices following a change in monitor topology. This creates a poor user experience and makes events such as docking a laptop computer to external monitors a source of frustration. Due to these deficiencies, users may have to search for previously open windows or rearrange windows each time a computing device is connected to a particular set of display devices. This interrupts user workflow and decreases usability because of the time and effort spent arranging windows and other user interface objects.

In view of the foregoing, it can be appreciated that there is a continual need to improve the user experience for modern computing devices that are frequently transitioned between different monitor topologies. In addition, there is a continual need to develop techniques for managing user interface elements that capture user preferences without requiring users to make manual adjustments every time monitor topology changes.

SUMMARY

The above deficiencies and other problems associated with existing handling of user interface objects are reduced or eliminated by the use of historical configuration data. For instance, historical configuration data can be used to maintain a consistent appearance for user interface objects such as windows, icons, menus, and web page elements displayed by a laptop computer when it is moved between different hosting environments. For example, the laptop computer may transition between monitor topologies having different monitor configurations, which may include moving from a home docking station having three monitors, to a temporary docking station having one monitor, to a work docking station having three monitors with slightly different sizes than the home setup. With each transition, the computer can control the appearance of user interface objects in the current hosting environment to provide a user with familiar user interface arrangements without requiring manual configuration.

The appearance of user interface objects, such as the size and position of windows, placement and availability of icons, configuration of menus, arrangement of web page elements, and any other display property of an object in a user interface is stored as historical configuration data for each hosting environment. A change in a hosting environment encompasses many types of changes to a user interfaces such as, but not limited to, addition or removal of monitors, moving between a 2D and 3D rendering, changing between tablet mode and desktop mode with or without changing monitors, switching between presentation mode and desktop mode, and the like. Monitor topologies are one example of hosting environments. As one example applicable to monitor topologies and more broadly to any hosting environment change, when docked to the home docking station the appropriate historical configuration data is used to configure the display of objects. Similarly, when docked to a single monitor, different historical configuration data is used to configure the user interface. Thus, the appearance of the user interface is configured for each hosting environment based on how user interface objects were rendered in the past on that hosting environment.

For example, when the laptop computer is docked to the work docking station, information such as window size, icon positions, menu configurations, arrangement of web page elements, and the like is used to configure user interface objects so that they appear as they were when previously connected to the work docking station. This provides an improved user experience compared to carrying over the arrangement of user interface objects from a single monitor environment. The same historical configuration data may also be used to configure user interface objects when the laptop computer is connected to a similar but not identical hosting environment such as the home docking station that also has three monitors. Thus, while different monitors may be recognized as different hosting environments, it is also possible to apply the same historical configuration data to configure user interface objects when the laptop computer is connected to a similar but not identical hosting environment, because that may result in a better experience for the user.

By storing previous window positions in previous monitor topologies (a specific example of a hosting environment), a computing device can restore these previous window positions when returning to a monitor topology. If there is a monitor topology change and there is a previously stored position for the current monitor topology (e.g., docking again to the same external monitors), this previous position is restored. Restoration of window positions using historical configuration data may replace the default action taken by an operating system when a monitor topology changes. Therefore, this disclosure is concerned with the combination of a hosting environment (e.g., a monitor topology) and the state of user interface objects (e.g., window positions, icon arrangement, menu configurations, and the like) on particular monitors or monitor types to provide an optimal user interface experience as a computing device moves from one hosting environment to another. Thus, use of historical configuration data to manage display of user interface objects provides a consistent and undisruptive user experience across hosting environment changes.

The disclosed techniques include a process for a user interface (UI) platform to manage display of user interface objects when there is a transition to a new hosting environment. Generally described, a computing device detects parameters of a current hosting environment. The parameters include such things as a number of display devices and attributes of the display devices. Parameters of the current hosting environment are compared to multiple hosting environment profiles that each specify one or more parameters. If the current hosting environment corresponds to one of the existing hosting environment profiles that profile is used to identify historical configuration data. Each hosting environment profile is linked to historical configuration data for one or more user interface objects.

The historical configuration data represents how a user interface object was rendered previously on the same or similar hosting environment. The historical configuration data provides a state of the user interface object that defines how the user interface object is rendered in a GUI provided by the UI platform. The state may be the result of a previous manipulation of the user interface object by a user such as the positioning of a window on a specific display device. The user interface object is rendered on one of the display devices in the current hosting environment according to the state provided by the historical configuration data.

If the current hosting environment is new to the computing device there may not be a matching hosting environment profile. If attributes of the current hosting environment are sufficiently similar to attributes of an existing hosting environment profile, then that existing hosting environment profile is used. However, if none of the hosting environment profiles correspond to the current hosting environment, the UI platform creates a new hosting environment profile. The new hosting environment profile is characterized by attributes of the current hosting environment such as a number of display devices and attributes of those display devices. The new hosting environment profile is added to a collection of any existing hosting environment profiles.

The states of user interface objects rendered in the new hosting environment are retained as historical configuration data. The state data defines at least partially how the user interface objects are rendered in a GUI. When transitioned to the new hosting environment, some user interface objects may be rendered according to default settings or rules provided by the UI platform. The rendering of some user interface objects may be changed by input data received from a user. The historical configuration data may be modified to reflect the changes. The UI platform uses the historical configuration data updated based on user changes to configure the rendering of user interface objects the next time it encounters the same hosting environment.

The techniques disclosed herein improve the user experience and productivity in a number of ways. By retaining the state of user interface objects as historical configuration data, the UI platform creates a record of how a user has configured the GUI for a particular combination of display devices. This record is accessed when the computing device later encounters the same hosting environment and is used to render the user interface objects in a way that is familiar to the user. The record may be stored locally on the computing device or may be maintained in a remote location such as cloud-based or network storage. This prevents or reduces interruptions to the workflow of the user during changes in the hosting environment because the user interface objects are arranged the same as in the past. In addition, the historical configuration data is not static but is updated whenever the rendering of a user interface object is changed. This creates a flexible technique for managing user interface objects that adapts to changing user behavior and preferences. Also, approximate matching between hosting environments that are not identical but share similar attributes enables the disclosed techniques to render user interface objects on new hosting environments in ways that are more likely to suit user preferences and workflows than default or system-supplied techniques.

It should be appreciated that these techniques provide many beneficial technical effects that improve efficiencies with respect to a wide range of computing resources. For instance, human interaction with a device may be improved as the use of the techniques disclosed herein enable a user to quickly resume working when there is a change in the hosting environment because the user interface is configured in a manner that is familiar to the user. Eliminating or reducing the need for a user to rearrange windows or adjust other aspects of a user interface can reduce a number of computing cycles, the volume of network traffic, and usage of memory.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 11 is a computer architecture diagram illustrating an illustrative computer hardware and software architecture for a computing system capable of implementing aspects of the techniques and technologies presented herein.

FIG. 13 is a computer architecture diagram illustrating a computing device architecture for a computing device capable of implementing aspects of the techniques and technologies presented herein.

DETAILED DESCRIPTION

Figure 1:
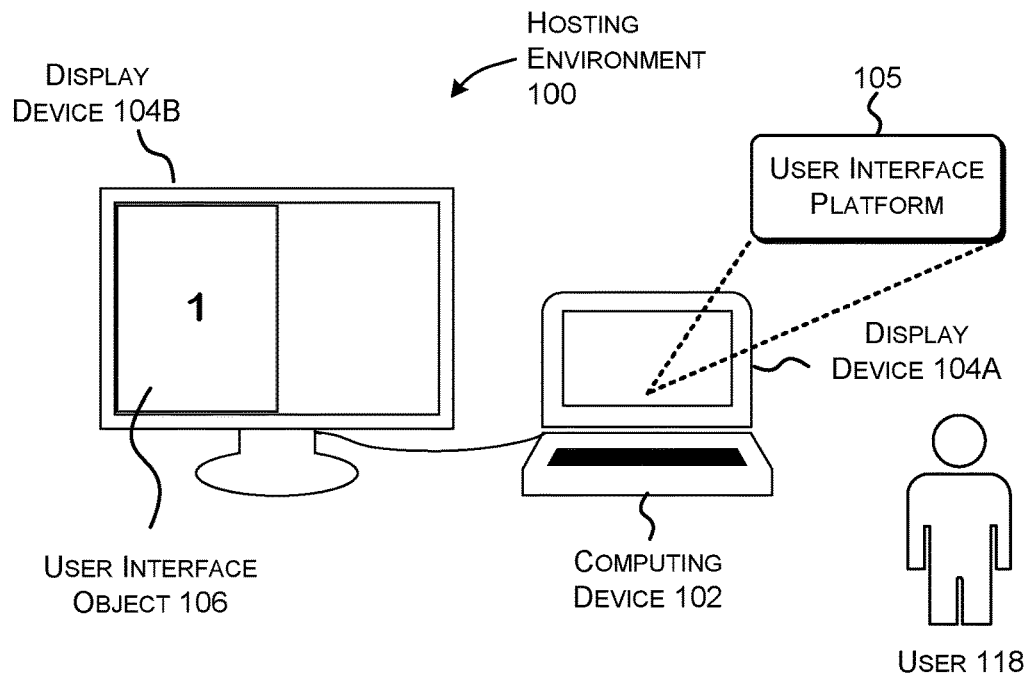
FIG. 1 illustrates the use of hosting environment profiles and historical configuration data to arrange user interface objects on the monitors of a computing device.

FIG. 1 illustrates a hosting environment 100 of a computing device 102. The hosting environment 100 is generally the hardware devices available to the computing device 102 for generating a GUI. A hosting environment may also be referred to as a hosting context or hardware configuration. Many different types of changes to the computing device 102 may cause a change in hosting environment such as changing from a 2D to 3D rendering (e.g., by connection of VR goggles), changing between tablet mode and desktop mode (e.g., by connection of a keyboard to a tablet device), switching between presentation mode and desktop mode (e.g., by connection to a projector or large-screen display), and the like. In one non-limiting example, the hosting environment 100 is a monitor topology. Monitor topology is the number, arrangement, and attributes of display devices 104 connected to a computing device 102. Hosting environments also include the configuration or way display devices are used. For example, a change to the orientation of a monitor from landscape to portrait is a change to the hosting environment.

Hosting environments can also include virtual displays generated by virtual reality (VR) headsets and augmented reality (AR) headsets. A change to the available virtual displays is a change to a hosting environment even if there is no change to any hardware device (e.g., no change to the hardware of the VR/AR headset).

The computing device 102 is shown as a laptop computer that includes a built-in display device 104A and an additional display device 104A configured as an external monitor. The hosting environment may include fewer or more than two display devices 104. Display devices 104 include any type of hardware capable of generating a GUI that may be perceived by a human user. Examples of display devices include monitors, televisions, 2D displays, 3D displays, holographic displays, and VR/AR headsets. Virtual displays or display surfaces generated by VR/AR headsets are also considered display devices.

A UI platform 105 controls the rendering of user interface objects 106 and other aspects of the UI and GUI provided by the computing device 102. A UI platform is software operating on a computing device that creates and manages a user interface including GUIs. A UI platform may be implemented in many ways such as middleware like WPF, Unity, HTML, or React Native. In some implementations, the UI platform 105 is an operating system such as, for example, Windows™ by Microsoft Corporation.

In this illustrative example, a user interface object 106 is rendered on display device 104A. The user interface object 106 is shown as a window. The window may be any type of window generated on a GUI such as an application window, a system window, an alert window, etc. User interface objects 106 are not limited to windows but include any GUI element or object that may be rendered on a display device 104. Examples of user interface objects 106 also include icons, menus, web page elements, and browser icons. The techniques of this disclosure may be used to control the display of any number of independent user interface objects 106 such as tens, hundreds, or thousands of different user interface objects 106.

Memory 108 available to the computing device 102 stores hosting environment profiles 110 and historical configuration data 112 that is used to configure the rendering of user interface objects 106. The memory 108 may be local to the computing device 102 or may be remote such as cloud-based or network storage. The hosting environment profiles 110 and historical configuration data 112 may be stored in temporary memory or persistent memory. If temporary, the hosting environment profiles 110 and historical configuration data 112 are not saved when the computing device 102 restarts or is shut down. Historical configuration data 112 stored temporarily may be lost if a window or other user interface object 106 is closed. In one implementation, the hosting environment profiles 110 and historical configuration data 112 are stored temporarily in the operating system stack. If stored persistently, the hosting environment profiles 110 and historical configuration data 112 may be saved when the computing device 102 restarts or is shut down. For example, the hosting environment profiles 110 and historical configuration data 112 may be stored persistently in the registry of an operating system or a configuration file.

There may be a plurality of hosting environment profiles 110 in the memory 108. Hosting environment profiles 110 may also be referred to as hosting environment definitions. Each hosting environment profile 110 is characterized by one or more parameters 114. The parameters 114 stored in a hosting environment profile 110 are compared to characteristics of the hosting environment 100 to determine if a hosting environment profile 110 corresponds to the hosting environment 100. The parameters 114 may be any aspect of a hosting environment 100 that can be used to differentiate it from other hosting environments. Examples of these parameters 114 include a number of display devices, the type of display devices (e.g., 2D or 3D, hardware or virtual, monitor or goggles, etc.), and attributes of each display device. Attributes for a display device depend on the type of display device. For many display devices, such as monitors, the attributes may include size, aspect ratio, resolution (e.g., DPI), refresh rate, color space, orientation (e.g., landscape or portrait), input capabilities (e.g., touchscreen, attached keyboard), audio output capabilities (e.g., built-in speakers), and hardware identifier (e.g., a unique identifier that distinguishes otherwise identical devices).

Each hosting environment profile 110 is linked to historical configuration data 112 for one or more user interface objects 106. FIG. 1 shows historical configuration data 112 for only one user interface object 106 for each hosting environment profile 110 for the sake of simplicity. However, a hosting environment profile 110 may be linked to historical configuration data 112 for many tens, hundreds, or thousands of different user interface objects 106. The historical configuration data 112 specifies how a user interface object 106 was displayed in the past. Historical configuration data 112 identifies the user interface object 106 to which it applies. For example, there may be historical configuration data 112 that indicates it applies to a window created by a specific word processing application.

Historical configuration data 112 specifies a state 116 of the user interface object 106. State 116 as applied to a user interface object 106 in this context is information that specifies an aspect or attribute of how the user interface object 106 is rendered in a GUI. Window state is the state 116 of a user interface object 106 that is a window. Window state may specify size (e.g., x- and y-dimensions in pixels), position (e.g., location on a monitor and on which of multiple monitors), maximized status (i.e., is the window maximized), minimized status (i.e., is the window minimized), and restore location (i.e., the position of a minimized window when it is enlarged).

In this illustrative example, the hosting environment profile 110 and linked historical configuration data 112 that correlated with the hosting environment 100 are indicated by a dashed rectangle. This hosting environment profile 110 is characterized by two display devices and the attributes of specific hardware identifiers. In this example, the hardware identifiers are those of the display device 104A and the display device 104A. The hosting environment profile is determined to correlate with the hosting environment 100 because of a match between the number of display devices and the hardware identifiers.

Once a hosting environment profile 110 is selected, the linked historical configuration data 112 is used to determine how the user interface object 106 is rendered in the GUI of the computing device 102. In this example, the user interface object 106 is an application window for a specific application (e.g., a productivity application, a game, a utility, a browser, etc.). The state 116 specified for this user interface object 106 is a size and position that occupies the left half of display device 104A. Thus, once the computing device 102 determines that it has hosting environment 100, the corresponding hosting environment profile 110 provides a linkage to historical configuration data 112 that specifies how the user interface object 106 should be displayed.

In the example provided in FIG. 1, the correspondence between the hosting environment 100 and the hosting environment profile 110 is an exact match. Values of parameters 114 that characterize the hosting environment profile 110 are the same as values of the parameters of the actual hosting environment 100. However, there may be a correspondence between a hosting environment 100 and a hosting environment profile 110 even if there is not an exact match.

The number and type of parameters 114 used to define a hosting environment profile 110 may allow for multiple different hosting environments 110 to correspond to a single hosting environment profile 110. For example, depending on how it is defined, a hosting environment profile 110 that specifies four, 4k monitors may correlate with any hosting environment 110 that includes four, 4k monitors. A hosting environment profile 110 that specifies one of the display devices being a VR headset may correlate with any of multiple hosting environments 110 that include a VR headset. The number, type, and specificity of parameters used to define any hosting environment profile 110 may be adjusted such as in response to usability feedback.

Parameters 114 that define a hosting environment profile 110 may be specified as ranges of values or values with a threshold amount of acceptable variance. For example, the number of display devices may be specified as more than one, two or three, more than three, two to six, etc. An attribute for a display device may similarly be specified as a range or as a value and a threshold. For example, the size of a display device may be specified as less than 15", between 23" to 27", inches, greater than 65", etc. The thresholds and amount of acceptable variance may be modified based on input received from a user 118. For example, one user may indicate that hosting environments 100 with three or four display devices 104 correspond to the same hosting environment profile 110. Yet a different user can indicate that three-monitor hosting environments 110 and four-monitor hosting environments 110 correspond to different hosting environment profiles 110. For example, one user may specify that the threshold for matching the monitor size attribute is plus or minus one inch while a different user specifies a threshold of plus or minus three inches.

Figure 2A:
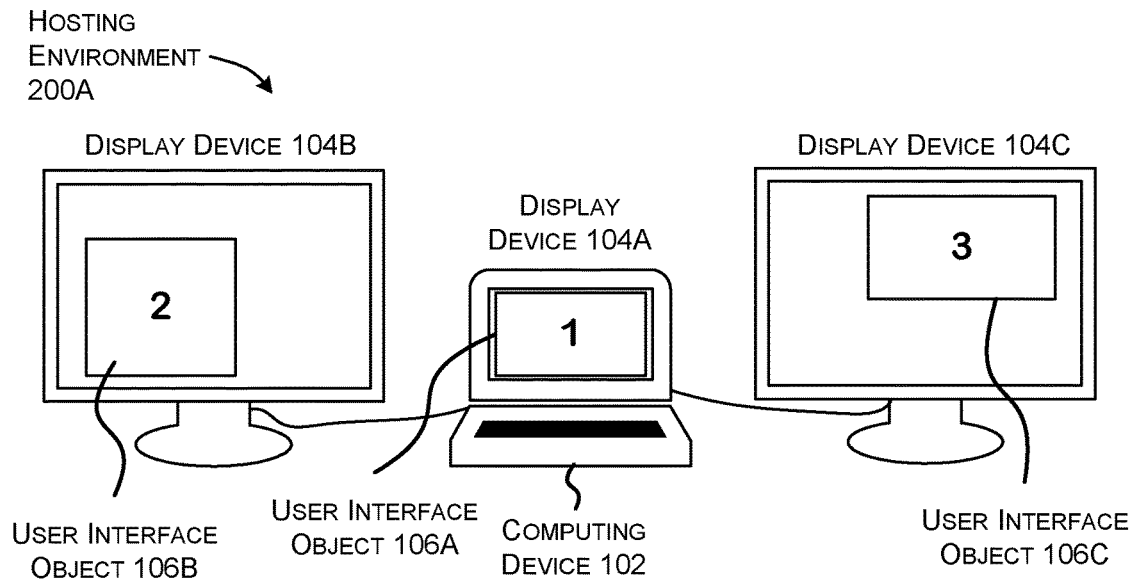
FIGS. 2A-C illustrate windows returning to their previous positions in a monitor topology after a laptop is disconnected and then reconnected to external monitors.
Figure 2B:
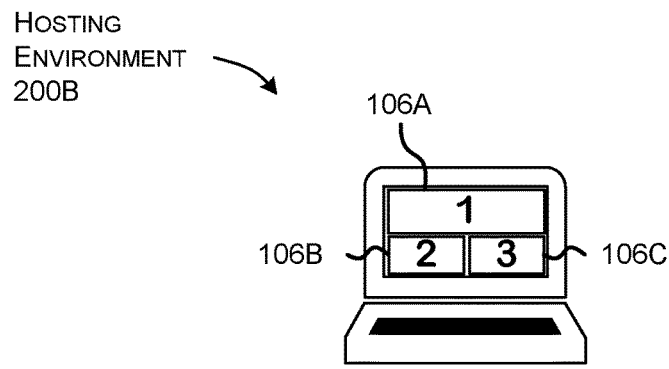
Figure 2C:
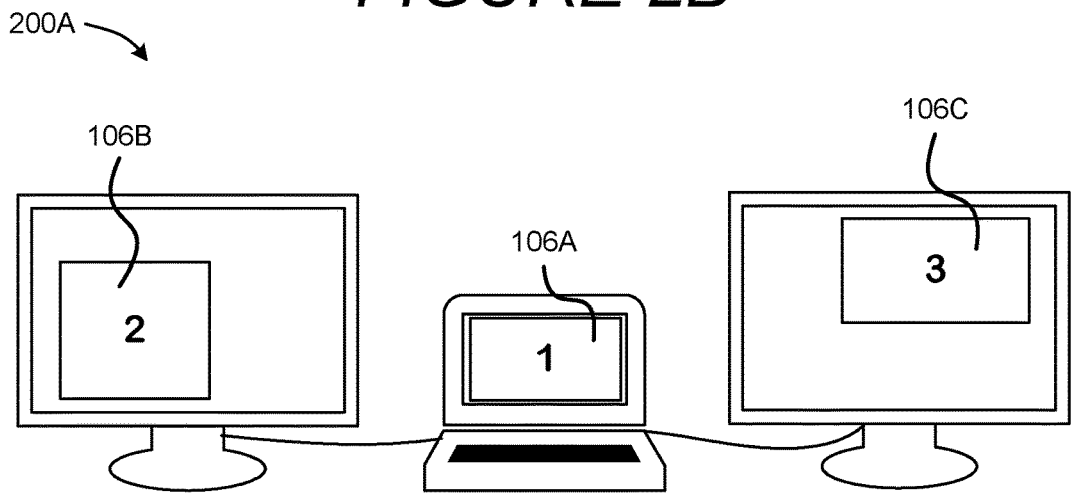

FIGS. 2A-C illustrate restoration of windows to their previous positions following a change in monitor topology. FIG. 2A shows hosting environment 200A at a first time. In hosting environment 200A the computing device 102 is a laptop computer, display device 104A is the built-in display of the laptop computer, display device 104A is a first external monitor, and display device 104C is a second external monitor. User interface object 106A is a window, such as an application window, maximized on display device 104A. User interface object 106A is a window positioned on display device 104A. User interface object 106C is a window positioned on display device 104C. As discussed above, the techniques of this disclosure apply equally to user interface objects 106 other than windows. The arrangement of the user interface objects 106 shown in FIG. 2A may be based on input provided by a user (i.e., the user arranging windows on the monitors). The states of the user interface objects 106A-C are retained as historical configuration data as shown in FIG. 1.

In FIG. 2B the computing device 102 is undocked from display devices 104A and 104C. This change in the hardware available to the computing device 102 for generating a GUI results in a different hosting environment 200B. In hosting environment 200B, all the user interface objects 106A-C are rendered on the built-in display of the laptop computer. This arrangement of the windows may be based on historical configuration data and/or processes and techniques to arrange windows in the absence of historical configuration data such as default rules supplied by an operating system.

FIG. 2C shows the computing device 102 returning to hosting environment 200A at a second time. Hosting environment 200A is recognized as a hosting environment that corresponds to the hosting environment profile and the historical configuration data generated in FIG. 2A. The historical configuration data is used to configure the rendering of user interface objects 106A-C. Window repositioning as illustrated in FIGS. 2A-C enables a user to immediately pick up where they left off after redocking to the laptop computer by storing information defining previous or "historical" window positions. The restored window positions shown in FIG. 2C are more likely to provide the desired user experience than window positions determined without consideration of how the windows were arranged in the past. With the techniques of this disclosure, a user can undock a laptop computer from several external monitors and later dock the laptop computer with the same monitors to find that the windows have returned to where they were when the laptop was last docked.

Figure 3A:
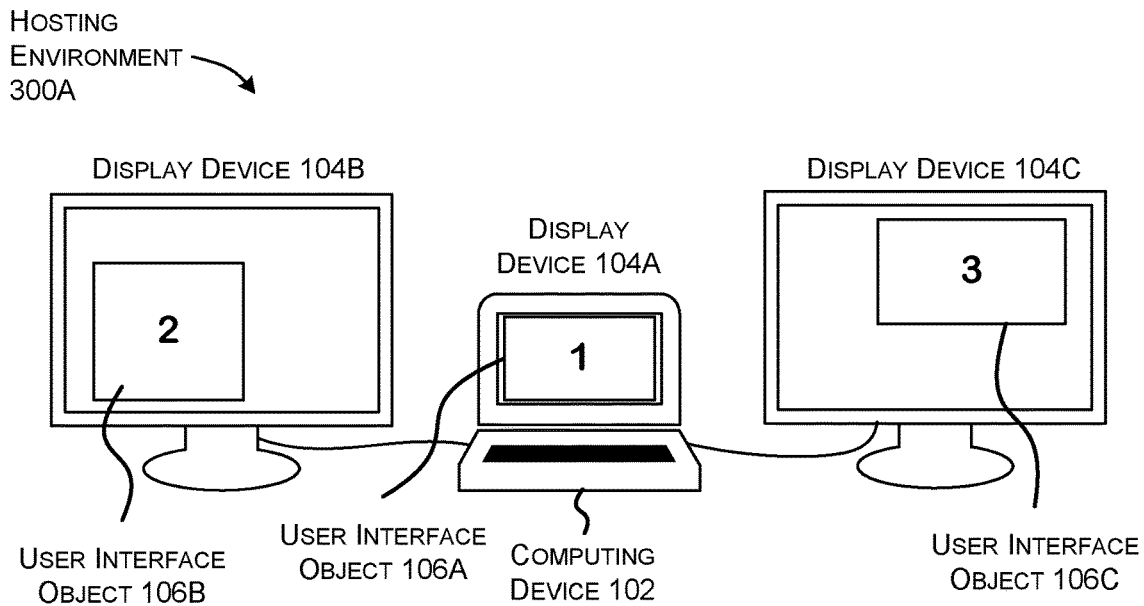
FIGS. 3A-C illustrate windows failing to return to their previous positions in a monitor topology after a laptop is disconnected and then reconnected to external monitors.
Figure 3B:
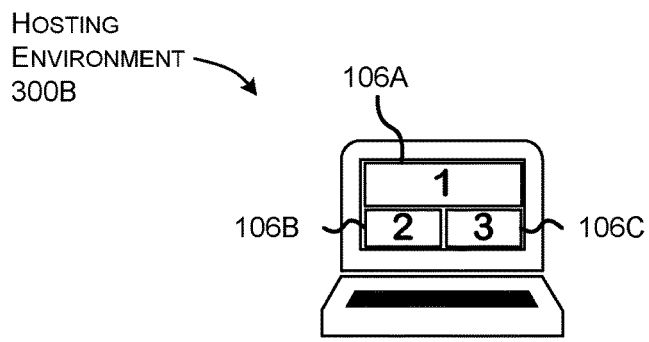

FIG. 3 illustrates the same hardware configuration as FIG. 2 demonstrating an undesirable arrangement of windows following a change in hosting environment. In this illustration, historical configuration data is not used to determine the arrangement of windows. FIG. 3A shows the arrangement of user interface objects 106A-C in hosting environment 300A at a first time. This may be the same hosting environment shown in FIG. 2A. FIG. 3B shows an arrangement of the user interface objects 106A-C when the hosting environment 300B is only the built-in display of the laptop computer.

Figure 3C:
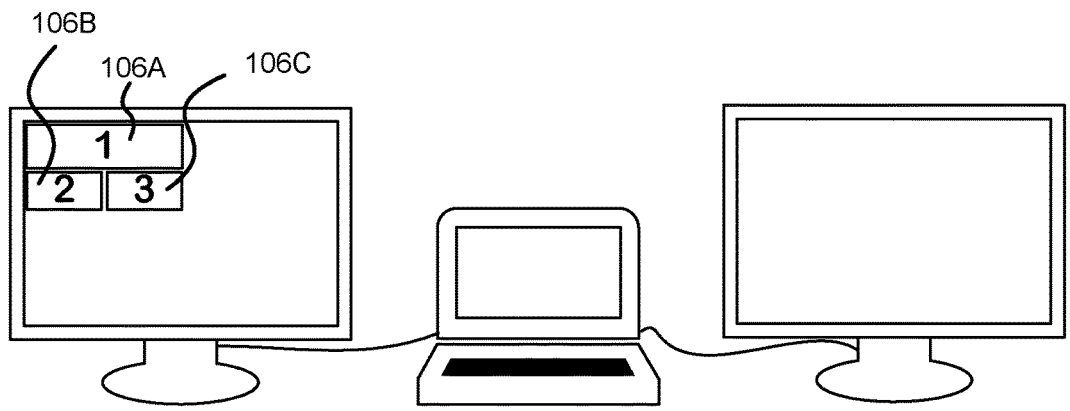

In FIG. 3C the hosting environment 300A is the same as in FIG. 3A. However, the placement of the user interface objects 106A-C is not the same. The user interface objects 106A-C are all positioned in the corner of display device 104A. In this illustration, the size and arrangement of the user interface object 106A-C relative to each other is the same as it was when they were displayed on the built-in display of the laptop computer in FIG. 3B.

Computing device 102 upon detecting a change in window topology from hosting environment 300A to hosting environment 300A arranged the user interface objects 106A-C according to a default or system-supplied technique. That technique may use the arrangement of user interface objects 106 from the immediately prior hosting environment 300B even if that hosting environment is different from the current hosting environment 300A. In this example, the positioning of user interface objects 106A-C is not tied to a specific hosting environment.

Figure 4A:
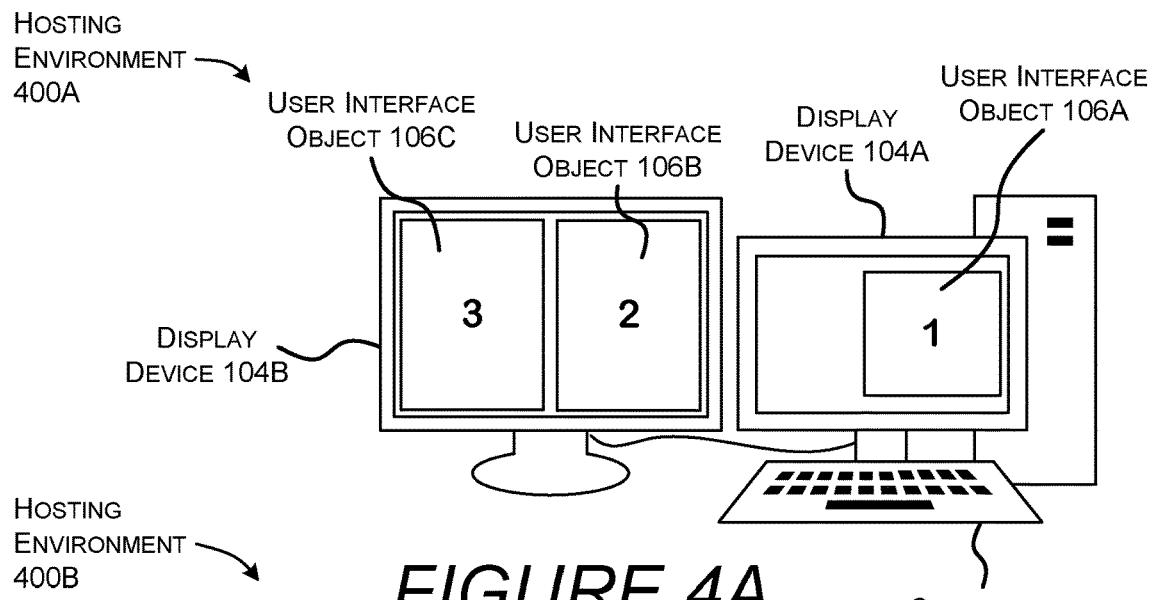
FIGS. 4A-C illustrate windows returning to their previous positions in a monitor topology after an additional external monitor is added then removed from a desktop computer.
Figure 4B:
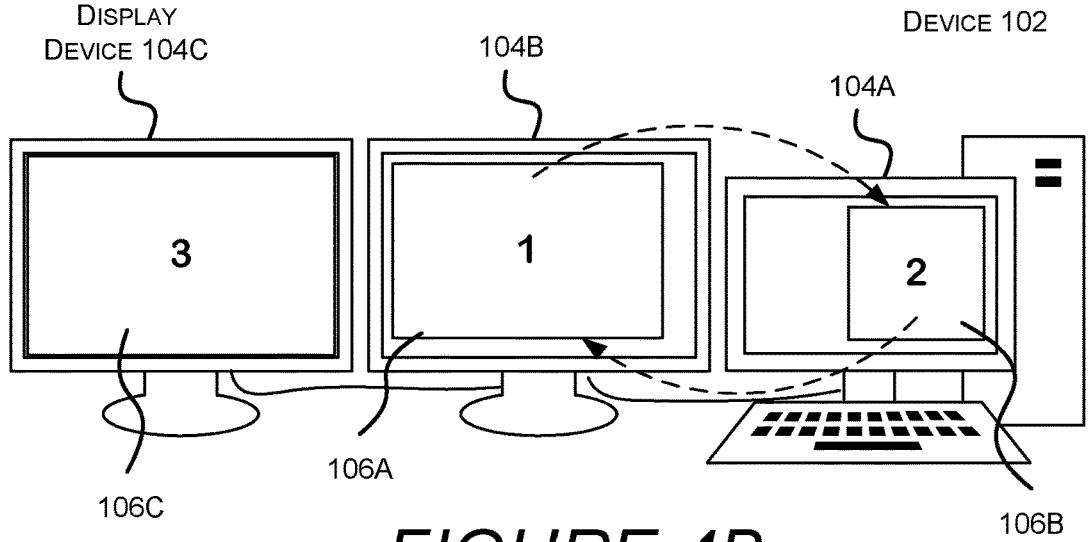
Figure 4C:
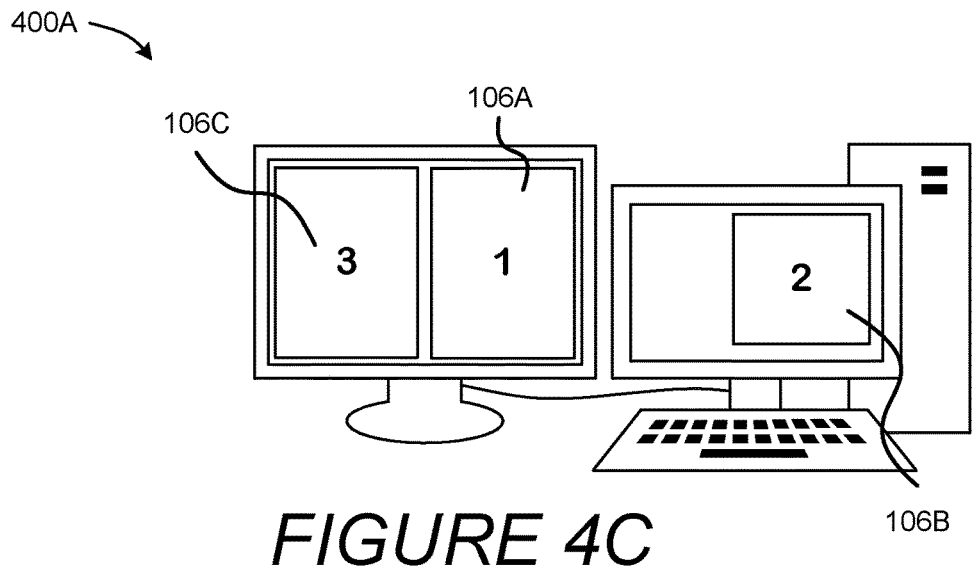

FIGS. 4A-C illustrate a change in a hosting environment that adds an additional monitor to a desktop computer. FIG. 4A shows hosting environment 400A at a first time. In hosting environment 400A the computing device 102 is a desktop computer, the display device 104A is a first monitor connected to computing device 102, and the display device 104B is a second monitor connected to the computing device 102. User interface objects 106A-C are illustrated as windows although user interface objects 106 are not limited to windows. The arrangement of the user interface objects 106A-C shown in FIG. 4A may be based on input provided by a user (i.e., the user arranging windows on the monitors). The states of the user interface objects 106A-C are retained as historical configuration data linked to a hosting environment profile.

The monitor topology is expanded in FIG. 4B by addition of display device 104C resulting in hosting environment 400B. User interface object 106C is moved to display device 104C due to historical configuration data or to system settings. User interface objects 106A and 106B are initially displayed on the same display devices 104A and 104B as they were in FIG. 4A. Then the user moves user interface object 106A to display device 104B and user interface object 106B to display device 104A.

FIG. 4C shows return to hosting environment 400A following removal of display device 104C. The user interface elements 106A-C are rearranged based on the arrangement shown in FIG. 4A but are not arranged the same. The techniques provided in this disclosure can use historical configuration data to configure the rendering of user interface objects 106 as one of multiple inputs in a flexible manner that also considers other aspects of a GUI. In an implementation, a series of hierarchal rules may specify how user interface object 106 are rendered when there is a change in the hosting environment.

For example, a highest priority rule may specify that the rendering of user interface objects 106 should be left unchanged if possible. This rule keeps user interface object 106B on display device 104A after removal of display device 104C even though historical configuration data indicates that user interface object 106B is to be placed on display device 104B. A second rule indicates that user interface objects 106 which can no longer be rendered as before due to removal of a display device, such as display device 104C, are rendered according to the historical configuration data for that user interface object 106. Thus, user interface object 106C is returned to the left half of display device 104A. That in turn requires a change to the rendering of user interface object 106A. On option is to render user interface object 106A according to the historical configuration data by returning it to the same position it occupied in FIG. 4A.

However, a rule that attempts to avoid placing windows on top of other windows may force a different placement of user interface object 106A. The different placement may be based on where windows were positioned in the historical configuration data captured from the monitor topology in FIG. 4A. The historical configuration data indicates that there was a user interface object 106 on the right half of display device 104A. Although it was a different user interface object (i.e., 106B instead of 106A) in FIG. 4A that position on the monitor topology may be used as a backup placement location when other rules prevent rendering in precisely the way indicated by the historical configuration data.

The rules provided in the example above are merely illustrative. A UI platform may use historical configuration data together with any number of other rules or processes to determine how user interface objects are rendered upon a change in hosting environment. Thus, historical configuration data will inform the display of user interface objects, but a UI platform is not forced to arrange the user interface objects in the same way every time the same hosting environment is encountered. For example, the UI platform may use a heuristics technique to determine the state of user interface objects for the current hosting environment. The heuristic technique uses historical configuration data and may also use other rules, default settings, application-specific settings, and the like to determine how to render user interface objects. For example, eye tracking may be used to determine where a user is looking. Rules may specify that user interface objects 106 under the gaze of the user should not be moved. Thus, the heuristic may determine that historical configuration data is not used for certain user interface objects 106 in certain hosting environments. Changes to the state of user interface objects 106 due to input received from a user may modify the heuristic techniques so that the UI platform continually improves the rendering of user interface objects 106 based on specific input from the user.

Figure 5A:
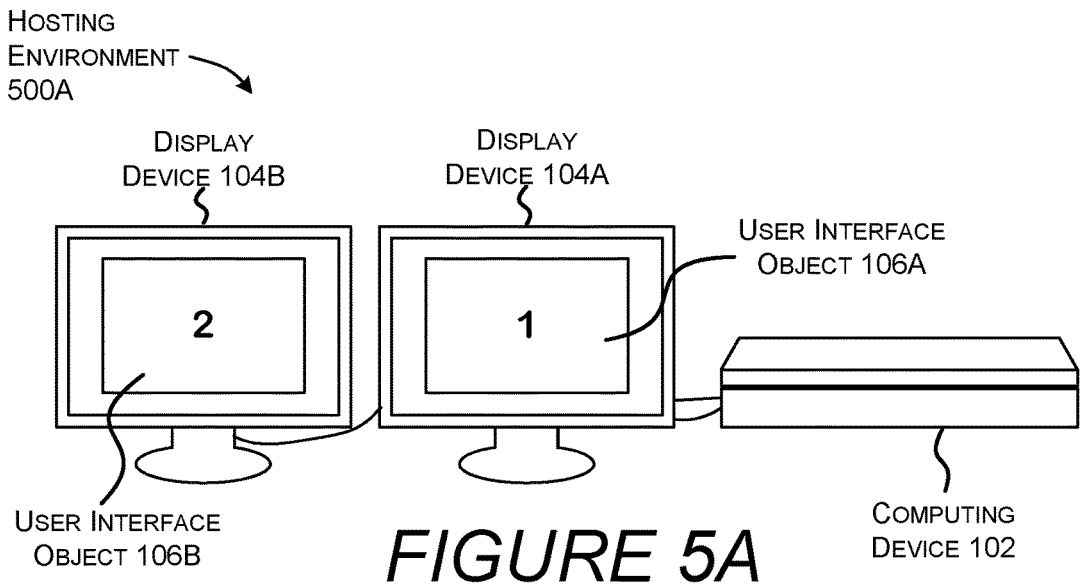
FIGS. 5A-C illustrate arrangement of windows on a monitor topology based on a previous arrangement of the windows on a similar but not identical monitor topology.
Figure 5B:
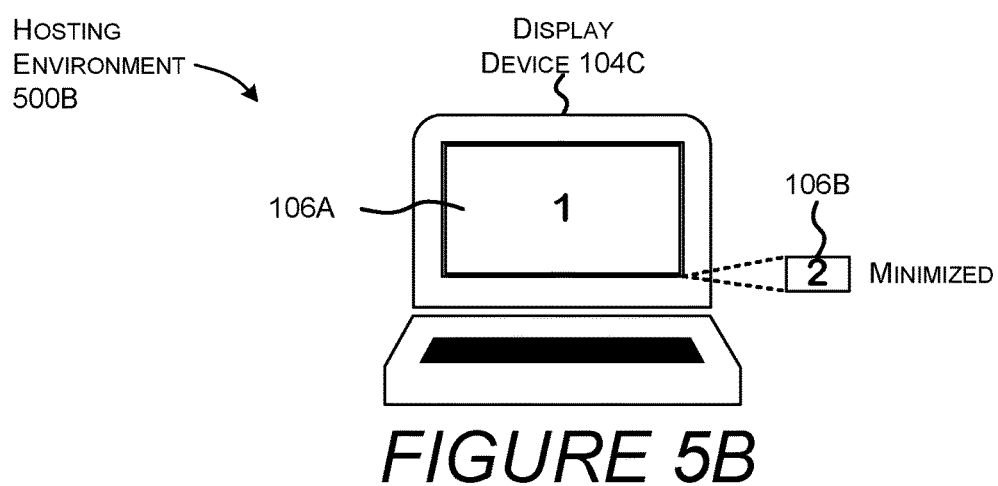
Figure 5C:
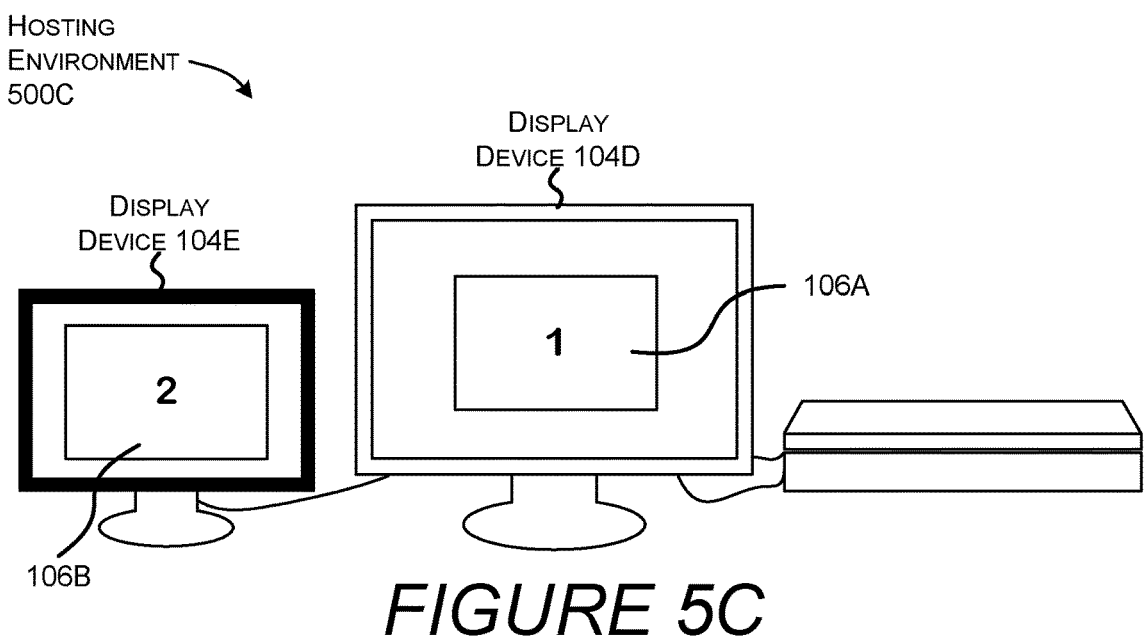

FIGS. 5A-C illustrate arrangement of windows in the same way they were arranged previously on a different but similar monitor topology. Due to the flexibility and latitude possible in a hosting environment profile, multiple distinct hosting environments can all correspond to the same hosting environment profile. Thus, the same state data may be used to configure the rendering of user interface objects 106 on two, or more, different hosting environments 104.

In this illustration, FIG. 5A shows hosting environment 500A. In this hosting environment 500A, a computing device 102 (a laptop computer) is docked to two external monitors indicated as display devices 104A and 104B. User interface objects 106A and 106B are arranged on the display devices 104A and 104B. Undocking the laptop computer and opening it to use the built-in display, display device 104C, is a transition to a different hosting environment 500B illustrated in FIG. 5B. In hosting environment 500B user interface object 106A is maximized and user interface object 106B is minimized.

The laptop computer is then closed and docked to a different pair of monitors illustrated by display device 104D and display device 104E in FIG. 5C. Hosting environment 500C shown in FIG. 5C is different than hosting environment 500A shown in FIG. 5A because the display devices 104 are not identical. Display device 104D has at least one attribute that is different from display device 104A. Display device 104E has at least one attribute that is different from display device 104A. The attributes that differ may be any of the attributes described elsewhere such as hardware identifier, resolution, and size. For example, display device 104D may have a different hardware identifier and size than display device 104A but have the same resolution, refresh rate, and color space. For example, display device 104E may have a different hardware identifier and refresh rate than display device 104A but have the same size, resolution, and color space.

The hosting environment profile that corresponds to both hosting environment 500A and hosting environment 500C specifies a hosting environment with two display devices. For the first display device, the hosting environment profile may specify an attribute such as size (e.g., 27.5") and a threshold for the attribute value (e.g., ±2.5"). The sizes of both display device 104A and display device 104D are within the threshold value of the specified size (e.g., 25" and 30" respectively) so that upon comparison both monitors are determined to correspond to the attributes specified in the hosting environment profile. For the second display device, both display device 104B and display device 104E have an attribute (e.g., refresh rate) that is within a threshold value of an attribute value specified in the hosting environment profile. For example, both display device 104A and display device 104E may have a refresh rate that is within 25 Hz of 100 Hz. Thus, user interface object 106A and 106B could be arranged in hosting environment 500C based on the same state data used to arrange user interface objects in hosting environment 500A.

The parameters and any thresholds (or ranges of values) that define a hosting environment profile may be configured by a user. For example, a first user may indicate that 27" monitors should be treated the same as 30" for determining if a hosting environment corresponds to a hosting environment profile. But a second user may indicate that any difference in monitor size results in the hosting environment corresponding to a different hosting environment profile. Thus, a UI platform may associate hosting environment profiles with specific user accounts. Determining which hosting environment profile corresponds to the current hosting environment may include determining which user account is active on a computing device and evaluating the hosting environment profiles associated with the active user account.

Even though hosting environments 500A and 500C both correspond to the same hosting environment profile in this example the differences in the display devices 104 may result in some change to how user interface objects 104 are displayed. Additional rules designed to improve the user experience may be combined with or partially override a literal application of the state provided by the historical configuration data. For example, if display device 104D has a different size than display device 104A, there are multiple potential ways to account for this difference in the configuration of user interface object 106A. User interface object 106A could be rendered using the same relative portion of the display area. If user interface object 106A fills half the screen on display device 104A it would then also fill half the screen on display device 104D. User interface object 106A may alternatively be rendered using the same number of pixels on display devices 104A and 104D (e.g., same width and height in pixels on both). As a further alternative, the real-world size of user interface object 106A may be maintained the same by accounting for monitor size and pixel density (e.g., the window has the same height and width in inches on both).

Figure 6A:
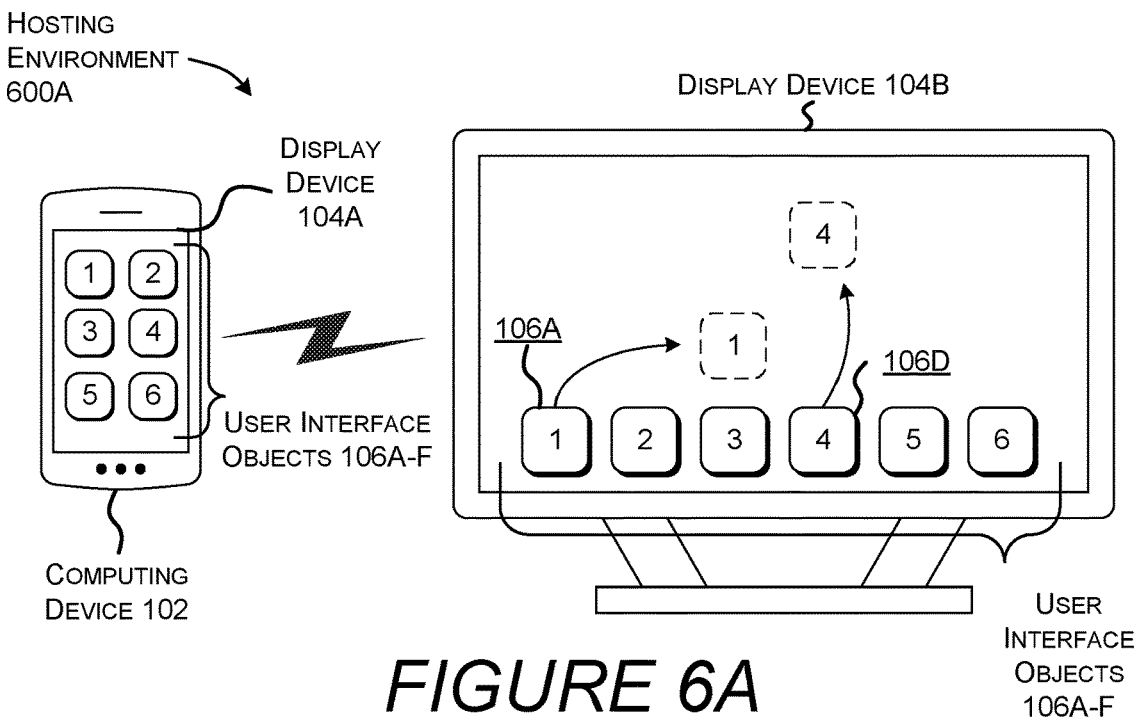
FIGS. 6A-C illustrate arrangements of icons on a television with a change in positions of the icons retained in historical configuration data linked to a monitor topology that includes the television.
Figure 6B:
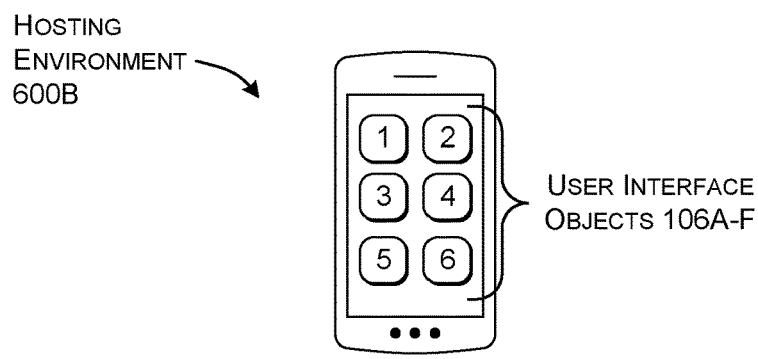
Figure 6C:
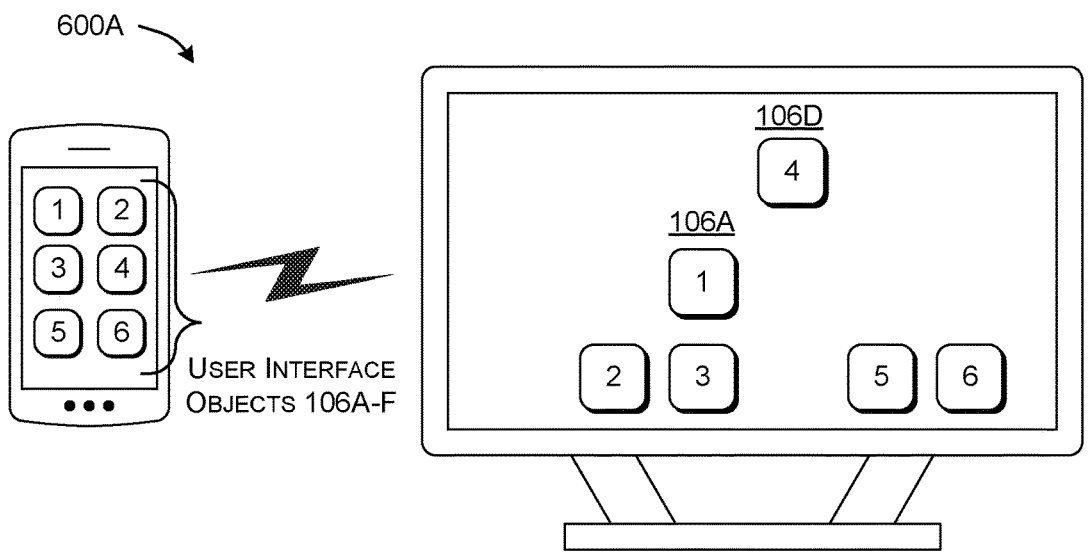

FIGS. 6A-C illustrate the effect of updating hosting environment profile data in response to a user changing the rendering of user interface objects 106. In hosting environment 600A of FIG. 6A a smart phone is the computing device 102 and it is wirelessly connected to a display device 104B illustrated as a television. The screen of the smart phone is also a display device 104A. In this hosting environment 600A, icons (user interface objects 106A-F) shown on display device 104B are also shown on display device 104A. This illustrates a type of screen mirroring. However, the arrangement of the icons is different on each display device 104A and 104B.

In FIG. 6A a user provides input that causes the location of user interface object 106A and user interface object 106D to change on display device 104B. This change does not affect the arrangement of the user interface objects 106A-F on display device 104A. The user input results in a change to the state of user interface object 106A and user interface object 106D (i.e., a different position on display device 104B). Historical configuration data linked to hosting environment 600A is updated to reflect the change in state. Historical configuration data may store a record of all the values of a state over time rather than just the most recent value. For example, historical configuration data for the icon that is user interface object 106A may store as the "position" state all the locations that icon has previously occupied on display device 104B.

FIG. 6B shows hosting environment 600B that results from loss of the connection to the television. In this example, the state of user interface objects 106A-F on display device 104A does not change between hosting environment 600A and 600B.

Upon return to hosting environment 600A as shown in FIG. 6C, the updated hosting environment profile is referenced to determine how the user interface objects 106A-F are rendered on display device 104B. User interface objects 106A-F are arranged as they were previously in hosting environment 600A. Specifically, user interface objects 106A and 106D are positioned on display device 104B as they were moved by the user while hosting environment 600A was last encountered by the computing device 102. Updating the states of user interface objects in the hosting environment profile allows changes and user selections to be retained so the UI platform is able to make better decisions about rendering of user interface objects 106.

Changes made explicitly by users to a user interface object are captured through the updating of hosting environment profiles. When the UI platform is determining how to display a user interface object, state data generated by input data from an action of a user may be given more weight than state data generated by a default rule or default system setting. For example, if the state data for user interface object 106A stores 10 different positions for the icon, the x and y coordinates of those positions may be averaged to determine where the icon is placed on the display device 104B. In some implementations, only a subset of the past states is used such as the most recent five states. If some of those positions result from the action of a user, those positions may be given greater weight (e.g., 1.1, 1.5, 2, etc. times more weight) than positions that are determined by default or other rules. As an alternative implementation, if the state of the user interface object 106A when the hosting environment 600A was last encountered is a state created by user input, then that state is used to configure the rendering of the user interface object 106A. But if the last state came from a default or system-generated rule a number of previous states may be used (e.g., by averaging values) to configure the rendering of the user interface object 106A.

Figure 7A:
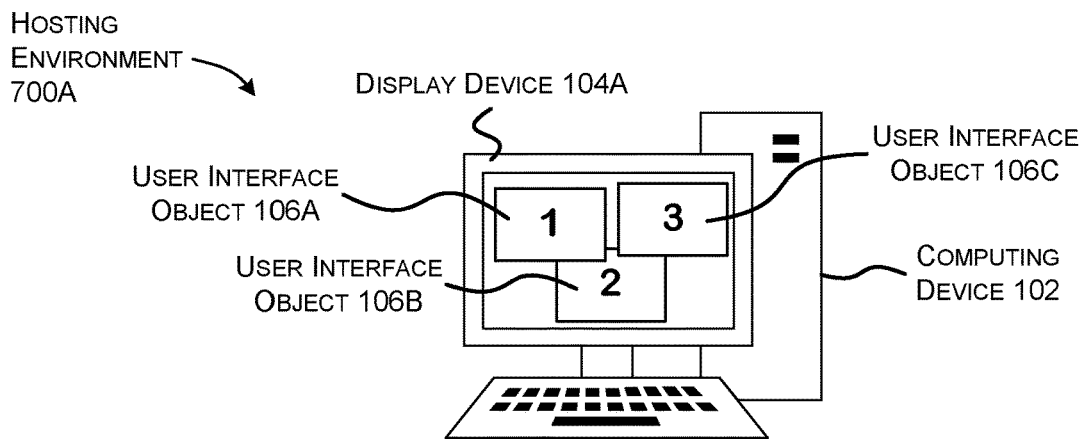
FIGS. 7A-C illustrate windows returning to their previous positions in a monitor topology after a desktop computer is accessed remotely from a different computing device.
Figure 7B:
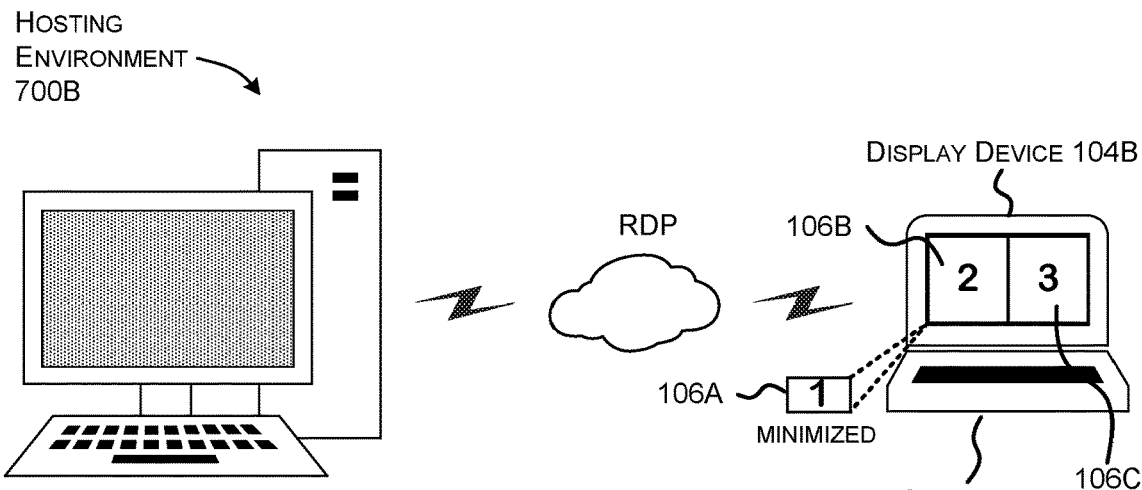
Figure 7C:
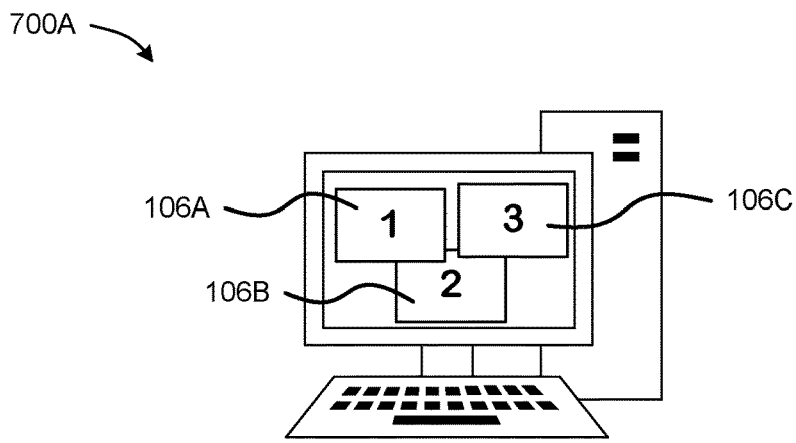

FIGS. 7A-C illustrate a change in hosting environment created by remotely connecting to a computing device 102 such as through a remote desktop connection, remote desktop protocol (RDP), terminal services, or similar. The hosting environment 700A shown in FIG. 7A exists when a user is directly interacting with the computing device 102. In this example, the computing device 102 includes a single display device 104A and there are three windows (user interface objects 106A-B) rendered on the display device 104A. Configuration of the user interface objects 106A-B is retained in a hosting environment profile linked to hosting environment 700A.

Upon connection to the computing device 102 through RDP or similar technique with a second computing device 702, the hosting environment changes to hosting environment 700B shown in FIG. 7B. In this configuration, computing device 102 provides the GUI, software, processing power, and storage. The remote computing device 702 may have an operating system and software but in this remote configuration those are not used to create the GUI displayed on display device 104B. Computing device 702 provides input and output devices to interact with the first computing device 102. The display device 104B available in hosting environment 700B is different than the display device 104A. For example, it may be the monitor of a laptop computer that is smaller than the monitor directly connected to computing device 102.

In this illustration, user interface object 106A is minimized while user interface objects 106B and 106C are displayed on the display device 104B. This arrangement of the user interface objects 106A-C may be specified by a hosting environment profile linked to hosting environment 700B and/or rules and settings provided by a UI platform.

Once the remote connection is ended, computing device 102 returns to hosting environment 700A as shown in FIG. 7C. Without reference to historical configuration data, the user interface objects 106A-C may be arranged on display device 104A the same way they were immediately before on display device 104B. That is, user interface object 106A may remain minimized and user interface objects 106B and 106C may each occupy half of display device 104A. However, this arrangement likely does not provide the best user experience when the user is sitting in front of computing device 102. Thus, the historical configuration data representing the state of the user interface objects 106A-C as illustrated in FIG. 7A is used to arrange those same user interface objects 106A-C. This allows a user to return to a computing device 102, such as a work computer, after a remote desktop session and find all of his or her windows arranged as they were previously.

Figure 8A:
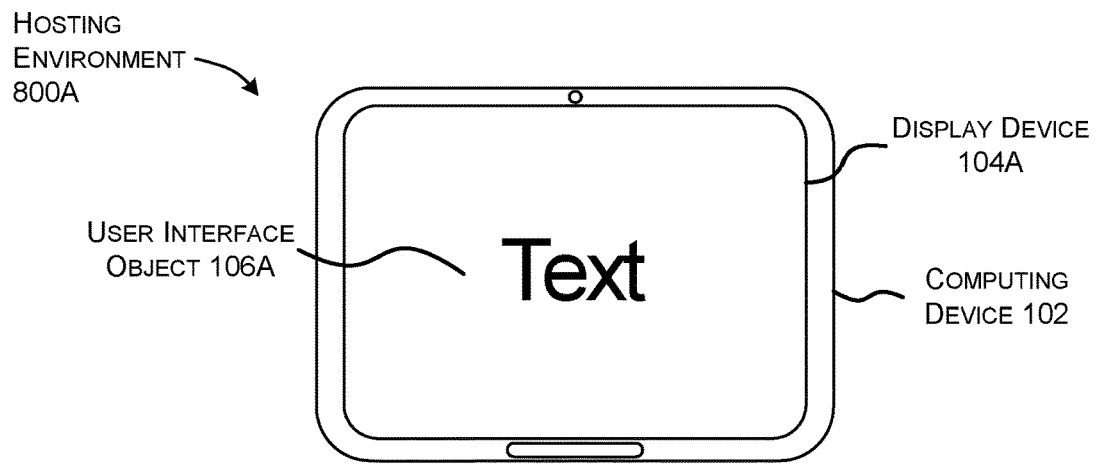
FIGS. 8A-C illustrate a color scheme of a graphical user interface on a tablet returning to a previous color scheme when the orientation of the tablet is changed from landscape to portrait and then back to landscape.
Figure 8B:
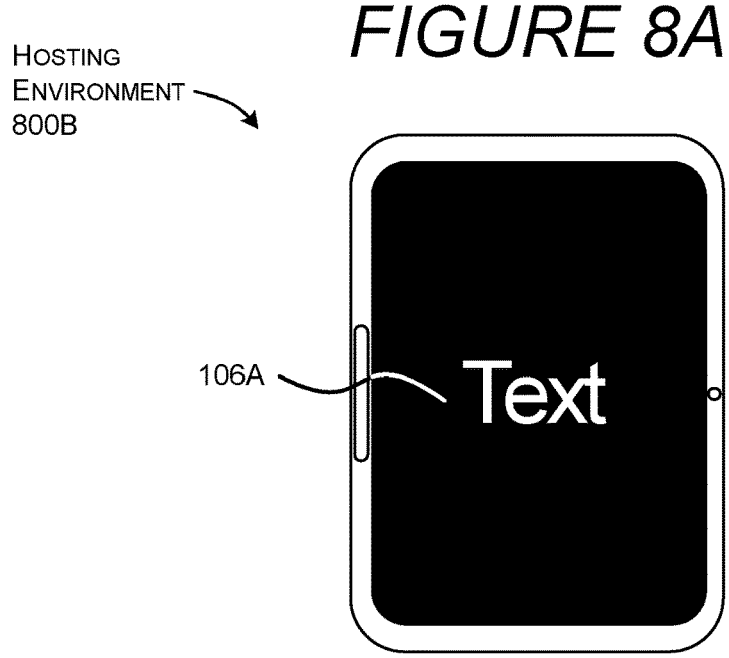
Figure 8C:
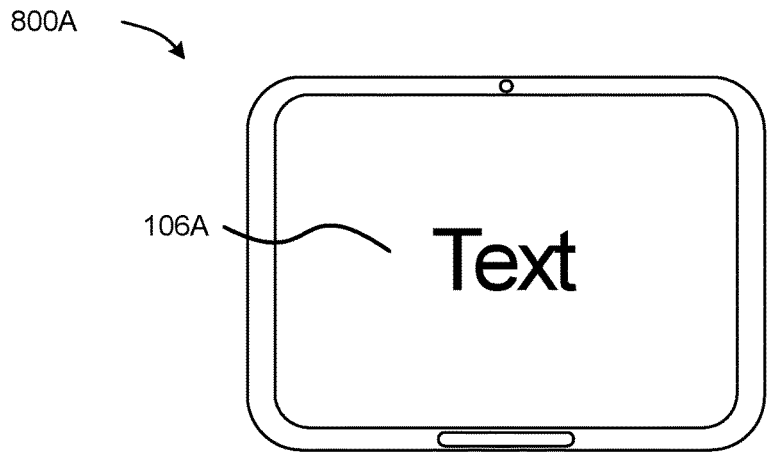

FIGS. 8A-C illustrate an example of a hosting environment change with a single monitor. In this illustration, the computing device 102 is a tablet computer that includes a display device 104A. In FIG. 8A the display device 104A is in landscape orientation which is hosting environment 800A. The user interface object 106A in this example is text that may be the text of a menu, icon, application, or representative of text throughout the GUI. In this example, the state of the user interface object 106A is the color or visual appearance of text (e.g., a change of a GUI from "light mode" to "dark mode"). The color of the user interface object 106A for hosting environment 800A is retained in a hosting environment profile.

FIG. 8B shows the computing device 102 rotated so that the display device 104A is in portrait orientation. This change in orientation is interpreted as a change to a different hosting environment 800B even though there were no monitors added or removed. In hosting environment 800B the color of user interface object 106A is changed. That change is illustrated as white text on a black background. The change in text color may be a result of a user changing the color scheme, a hosting environment profile linked to hosting environment 800B, or something else.

Similar changes in orientation of a display device may be made on a monitor attached to laptop or desktop computer and are not limited to tablet or hand-held devices. Changes to the hosting environment may also occur without change to the identity of the available hardware devices by changing any other attribute of a display device such as changing the resolution (DPI) setting of a monitor. Similarly, the hosting environment may change without any change to the hardware of a display device when an external keyboard is attached to a tablet device. For example, attaching a keyboard may change an attribute of the display of the tablet device from tablet mode to laptop mode.

Upon return to a landscape orientation and hosting environment 800A as shown in FIG. 8C, the color of the user interface object 106A is changed back to black text on a white background as specified in the historical configuration data. Without reference to historical configuration data, the user interface objects 106A may keep the same state it had in hosting environment 800B (i.e., remain as white text on a black background).

FIGS. 9A and B illustrate a change in hosting environment due to a change in the number of surfaces provided by virtual displays. In hosting environment 900A, AR goggles 902 generate two virtual displays 104A and 104B. Virtual display 104A displays two user interface objects 106A and 106B illustrate here as windows. The hosting environment 900A shown in FIG. 9A also includes a television or monitor indicated as display device 104C. However, a hosting environment may be entirely virtual generated by AR/VR goggles without any conventional monitors. The arrangement of user interface objects 106A and 106B in hosting environment 900A (i.e., both on virtual monitor 104A) is retained as historical configuration data.

Figure 9B:
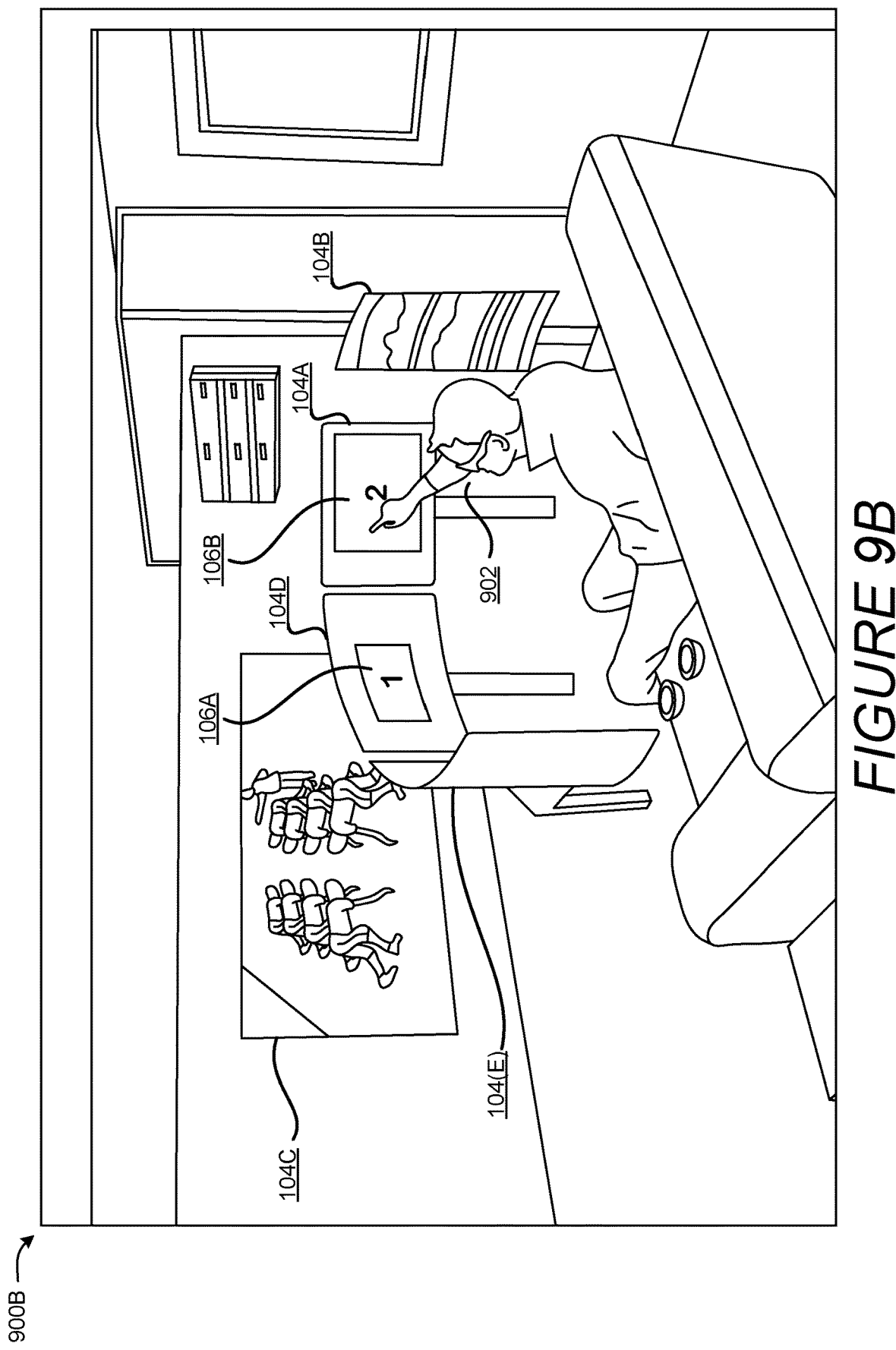
FIGS. 9A and B illustrate an arrangement of windows on virtual monitors viewed with augmented reality goggles changing when the number of virtual monitors is increased.

FIG. 9B shows a hosting environment 900B that differs from hosting environment 900A only in the addition of two more virtual displays 104D and 104E. Historical configuration data linked to hosting environment 900B specifies placement of user interface object 106A on virtual display 104D and user interface object 106B on virtual display 104A. This change in the rendering of user interface objects 106 following a change of the available virtual display surfaces is analogous to a change in the number of monitors.

As a further related example, removal of the AR goggles 902 would cause a change to a different hosting environment that includes only display device 104C. Because virtual displays 104A-E are no longer available as display devices after removal of the AR goggles 902, the user interface objects 106A and 106B would need to be rendered differently. Historical configuration data can specify how those user interface objects 106A and 106B should be rendered after the AR goggles 902 are no longer available. For example, the user interface objects 106A and 106B may be placed off screen or moved to display device 104C.

Figure 10A:
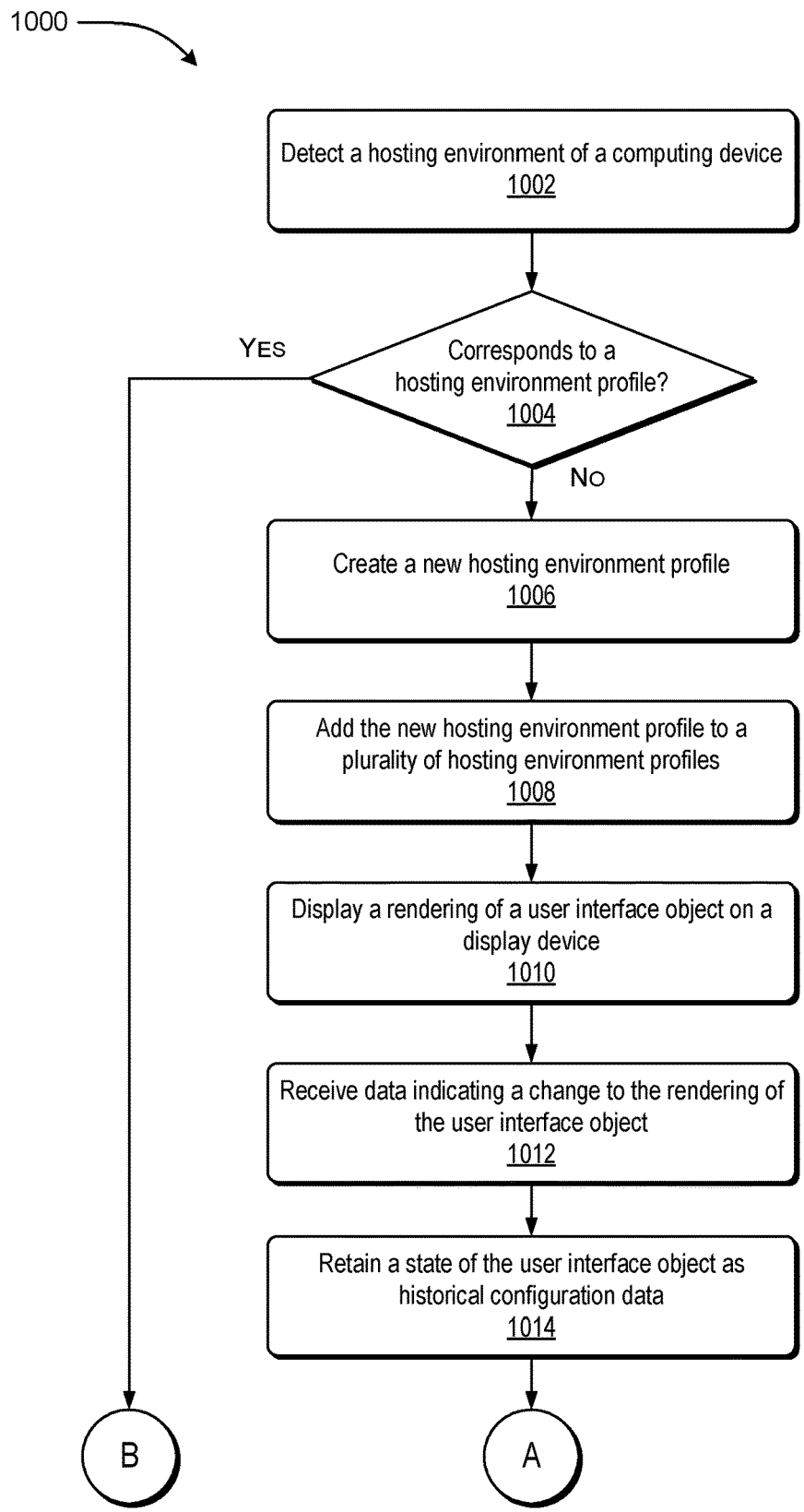
FIGS. 10A-C are a flow diagram showing aspects of a process for configuring an appearance of the rendering of user interface objects based on a hosting environment.
Figure 10B:
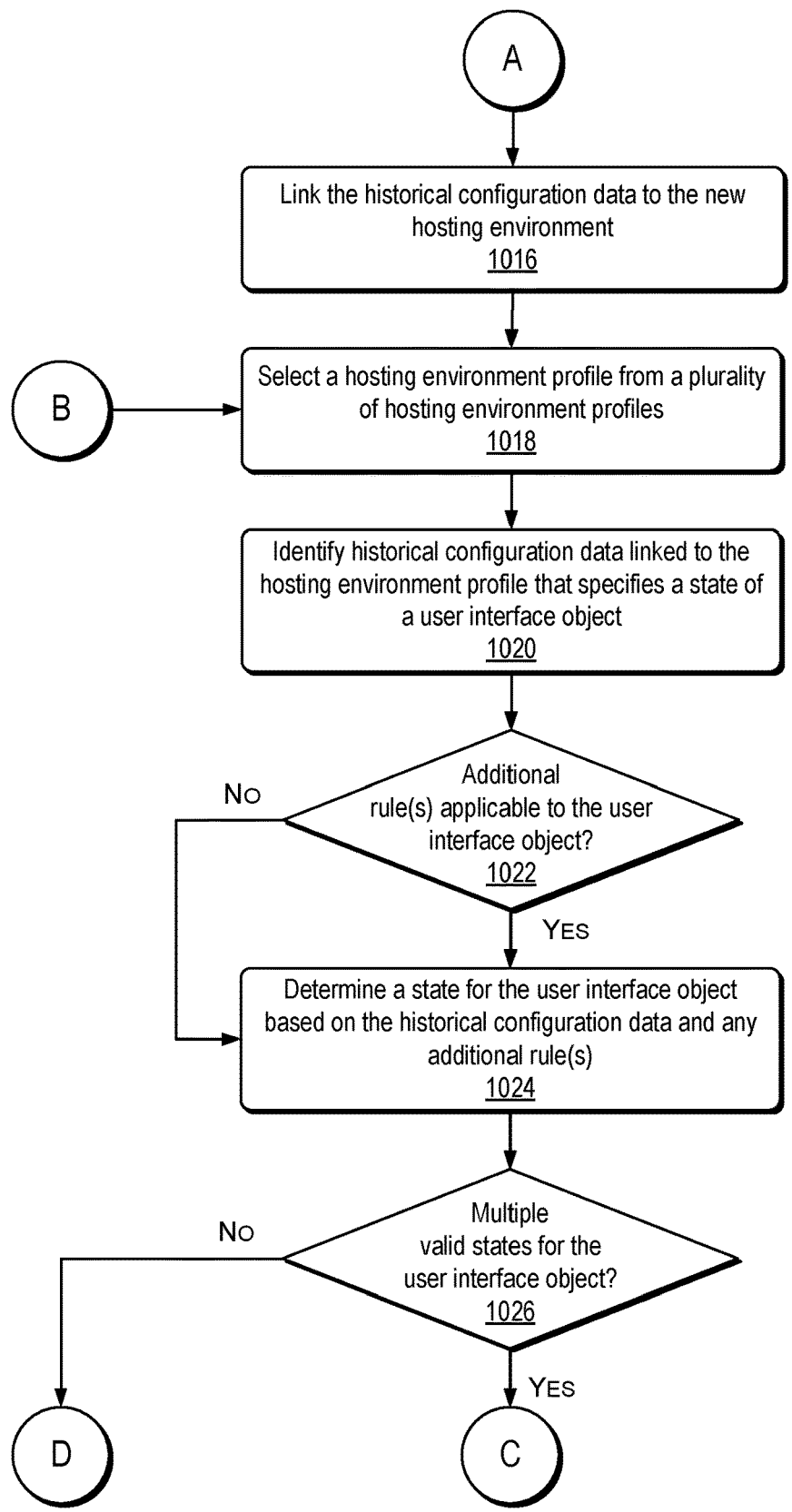
Figure 10C:
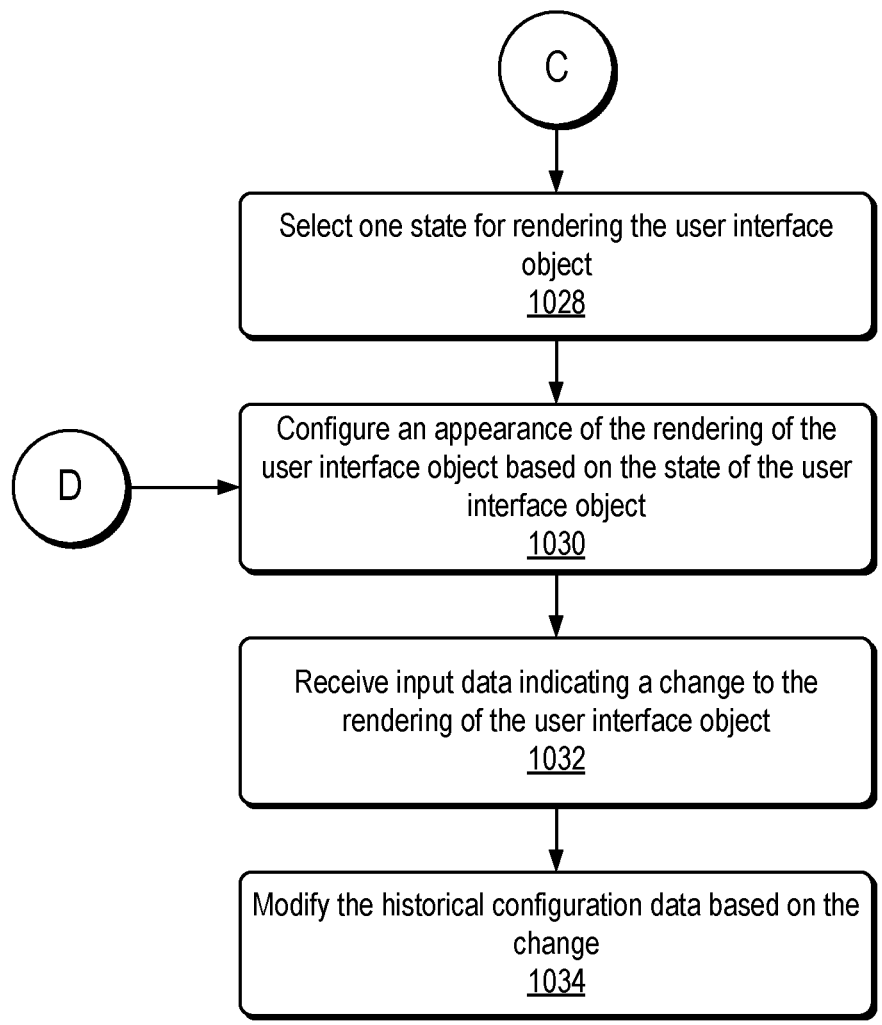

FIGS. 10A-C are a flow diagram illustrating aspects of a routine 1000 for enabling aspects of the present disclosure. It should be appreciated that the logical operations described herein with regard to FIG. 10, and the other figures, can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

For example, the operations of the routine 1000 can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 1000 may be also implemented in many other ways. For example, the routine 1000 may be implemented, at least in part, by a processor of another remote computer, processor or circuit. In addition, one or more of the operations of the routine 1000 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein. Routine 1000 may provide a method for managing a user interface object displayed by a computing device.

The routine 1000 begins at operation 1002 where a hosting environment of a computing device is detected. The hosting environment, as used herein, is the display devices available to a computing device for generating a GUI. Monitor topology is one example of a hosting environment. The hosting environment comprises one or more display devices and provides a GUI. The hosting environment may be detected by a UI platform such as, but not limited to, an operating system. A hosting environment may be characterized by one or both of a number of display devices and an attribute of one or more of the display devices. Both the number of display devices and any attributes of those display devices may be detected at operation 1002. The hosting environment may be a monitor topology and/or the capabilities of one or more virtual displays.

In various implementations, the one or more display devices can be any of a monitor, a 2D display, a 3D display, a holographic display, a virtual reality headset, an augmented reality headset, or a virtual monitor. The number of display devices may be two, three, four, five, six, seven, eight, or nine or more. The attributes of the display devices may be any one or more of size, resolution, refresh rate, color space, orientation, input capability, audio output capability, and hardware identifier. In an implementation, a first one of the display devices is one of a monitor, a 2D display, a 3D display, a holographic display, a virtual reality headset, an augmented reality headset, or a virtual monitor and a second one of the display devices is a different one of a monitor, a 2D display, a 3D display, a holographic display, a virtual reality headset, an augmented reality headset, or a virtual monitor. For example, the first one of the display devices is a monitor and the second one of the display devices is a virtual reality headset or an augmented reality headset.

The hosting environment may be detected in many ways including receiving indications of display device availability and attributes from the display devices themselves, an operating system, or other source. A change in hosting environment may be detected when there is a change in the hardware available to a computing device to render a GUI. In some implementations, a change in the number or capabilities of virtual display devices is a change to the hosting environment. The hosting environment may also be detected upon a computing device waking from sleep or after restart.

Hosting environments are a general concept that includes changes to monitor topologies such as docking and undocking a laptop computer. The availability of multiple monitors for docking or undocking is one example of a hosting environment change. Other examples include entering or leaving tablet mode, switching between RDP and directly logged in (which can also affect DPI, color space, etc.), switching between a 2D and 3D environment (like using HoloLens or HoloLens 2 available from Microsoft Corporation), etc.

Next, at operation 1004, it is determined if there is a hosting environment profile that corresponds to the hosting environment detected at operation 1002. Determining that the current hosting environment corresponds to or "matches" an existing hosting environment profile may be based on a comparison of parameters between the current hosting environment and parameters of a plurality of different hosting environment profiles. Each of the plurality of hosting environment profiles are characterized by parameters that specify at least one of a number of display devices or an attribute of the one or more display devices. The parameters specified for the respective hosting environment profiles are compared to the number display devices and/or attributes of the display devices in the hosting environment.

The parameters may specify that the number of display devices is two, three, four, five, six, seven, eight, or nine or more.

Correspondence does not necessarily require an exact match. The comparison may determine that the number and/or the attributes of the display devices in the hosting environment are within a threshold amount of a value for the number or display devices data or the attribute specified in the hosting environment profile. Thus, a hosting environment that is "close enough" to a hosting environment profile may be determined to correspond. The threshold amounts and tolerable variance may be modified based on input received from a user. Accordingly, different users may be able to differentially indicate how close of a "match" is required for a hosting environment to correspond with a given hosting environment profile.

If a corresponding hosting environment profile is not found, routine 1000 proceeds along the "no" path to operation 1006. This may result from a determination that none of the plurality of hosting environments profiles correspond to the hosting environment. If there is a corresponding hosting environment profile, routine 1000 proceeds along the "yes" path to operation 1018 shown on FIG. 10B.

At operation 1006, a new hosting environment profile is created. The new hosting environment profile is characterized by the number of display devices and/or the attribute of one or more of those display devices in the hosting environment. The selection of which attributes of the display devices are used for characterizing the new hosting environment profile may be made by a user or by the UI platform. In some implementations, every attribute of the display devices detected at 1002 is used to characterize the new hosting environment profile.

At operation 1008, the new hosting environment profile is added to the plurality of hosting environment profiles. The plurality of hosting environment profiles, including the new hosting environment profile, and linked historical configuration data is stored transiently or persistently in memory. As an example of persistent storage, the new hosting environment profile may be added to a registry of an operating system.

At operation 1010, a rendering of the user interface object is displayed on a display device. The user interface object may be any of the types of user interface objects described in this disclosure such as a window, an icon, a menu, a web page element, or a browser icon.

At operation 1012, input data from an action of a user indicating a change to the rendering of the user interface object may be optionally received. The change may be any type of change that affects the appearance of the user interface object on the GUI. For example, the change may be a change in size, location, position, or color.

At operation 1014, a state of the user interface object is retained as historical configuration data. The state defines at least in part how the user interface object is rendered on the GUI. The state may be, for example, any one or more of size, position, maximized status, minimized status, and restore location.

Next at operation 1016, the historical configuration data is linked to the new hosting environment profile. The linkage may be accomplished by any technique for associating two sets of data in a computing system. For example, the host environment profile and historical configuration data may be linked to each other by placement in the same record within a table or database. As an additional example, a pointer may be created from the hosting environment profile to the historical configuration data. The computing device may store the new hosting environment profile and the historical configuration data in memory such as persistent memory (e.g., a configuration file or registry of an operating system).

At operation 1018, a hosting environment profile is selected from a plurality of hosting environment profiles each characterized by parameters specifying at least one of a number of display devices and/or an attribute of one or more of the display devices as illustrated in FIG. 1. Selection of a hosting environment profile may be based on comparison of the number of display devices or the attribute of the one or more of the display devices specified in the hosting environment profile to the number of display devices or the attribute of the one or more of the display devices in the hosting environment. The plurality of hosting environment profiles and the linked historical configuration data may be stored in memory such as persistent memory (e.g., a configuration file or registry of an operating system).

At operation 1020, historical configuration data linked to the hosting environment profile selected at operation 1006 is identified. The historical configuration data specifies a state of a user interface object for a given hosting environment. The user interface object may be, for example, a window, an icon, a menu, a web page element, or a browser icon. The state of the user interface object may be associated with a previous manipulation of the user interface object by a user. The state defines at least in part how the user interface object is rendered in the GUI. For example, the state of the user interface object such as a window may be any one or more of size, position, maximized status, minimized status, and restore location. A state of a user interface object may include any type of information relevant to display on a GUI. A state may indicate a size and/or position of application icons or menus. Windows™, as an example of an operating system, has formalized (for windowing purposes) the definition of a monitor topology as well as "previous window state" (i.e., the last position a window had in a particular monitor topology). This allows a computing device to store a list of previous window positions with a monitor topology at the time the computing device left that monitor topology.

At operation 1022, it is determined if there are any additional rules applicable to the state of the user interface object. The additional rules come from sources other than historical configuration data. For example, additional rules may come from any of system settings, operating system default UI layout rules, individual display devices, user preferences, software settings, and other sources.

At operation 1024, a state is determined for the user interface object based on the historical configuration data and any additional rule(s). The state may be determined by the user interface platform using a heuristic that receives multiple inputs to generate a single output which is the state. If there are no additional rules, the state may be determined solely by the state indicated in the historical configuration data.

The state may be determined by weighing various rules in combination with the historical configuration data. For example, there may be two rules that apply to the configuration of a given user interface object as well as historical configuration data. Each of the rules and the historical configuration data may be assigned a numeric weight. The relative values of the numeric weights may determine the relative extent to which each rule and the historical configuration data influences the state of the user interface object. For example, if two rules each indicate a window should be minimized and those rules have respective weights of 4 and 5 while the historical configuration data is assigned a weight of 10 and indicates the window should be maximized, the window would be maximized.

The state may alternatively be determined by applying the rules and historical configuration data hierarchically. For example, a rule or historical configuration data with the greatest priority in a hierarchy may be applied to the exclusion of any other. As a further example, application of a rule or historical configuration data may be applied based on the existence of a condition. For example, if a user is interacting with a user interface element (e.g., an active window, an icon that is under a cursor, a web page element view by the user as determined by eye tracking) a rule may specify that the user interface element is not moved. This rule may take priority over any state specified in historical configuration data.

At 1026, it is determined if there are multiple valid states for the user interface object. For example, if two new monitors are added to a monitor topology, the historical configuration data may specify that a user interface object can be placed on either monitor. Also, a rule and historical configuration data may be equally weighted and specify different states for a user interface object. In these and other scenarios, there can be multiple valid states for a user interface object. However, ultimately one state must be selected for rendering the user interface object.

At 1028, if there are multiple valid states, one state is selected for rendering the user interface object. The state may be selected using any number to tie-breaking techniques. For example, the most recent state of the user interface object may be selected if it one of the valid states. As a further example, if one of the valid states is based on input data received from the user (i.e., in contrast to a state provided by a system) that state may be selected.

At operation 1030, an appearance of the rendering of the user interface object is configured based on the state of the user interface object determined at operation 1024 or selected at operation 1028. The rendering of the user interface object may also be based on one or more rules. The rendering of the user interface object may also be based on a tie-breaking technique if there are multiple valid states. The rendering of the user interface object may also be based on any additional factors.

The user interface object may be presented to the user in the GUI with an appearance as specified by the state (i.e., if the state indicates a window is maximized then the window itself is maximized). Thus, the hosting environment is used to identify a hosting environment profile that is linked to historical configuration data that in turn provides a state specifying how the user interface object appears on the GUI. In some implementations, the state provided by the historical configuration data is one input among multiple different inputs that are used to determine the appearance of the user interface object. Thus, the user interface object does not necessarily appear precisely as specified in the historical configuration data.

At operation 1032, input data from an action of a user indicating a change to the rendering of the user interface object may be received. A user may change the rendering of the user interface object from a first state to a second state such as shown in FIG. 6. For example, the user may change the location of an icon on a display device.

Next, at operation 1034, the historical configuration data is modified to specify the second state for the user interface object. For example, the state in the historical configuration data for an icon is changed to specify the location to which the icon was just moved by the user. State data representing this new location for the icon may overwrite or replace previous location data. In other implementations, the new location (i.e., the second state) and the previous location (i.e., the first state) are both retained in the historical configuration data.

FIG. 11 shows additional details of an example computer architecture 1100 for a computer, such as the computing device 102 shown in FIG. 1, capable of executing the program components described herein. Thus, the computer architecture 1100 illustrated in FIG. 11 illustrates an architecture for a server computer, a guest device, a host device, a mobile phone, a PDA, a smart phone, a desktop computer, a netbook computer, a tablet computer, and/or a laptop computer. The computer architecture 1100 may be utilized to execute any aspects of the software components presented herein.

The computer architecture 1100 illustrated in FIG. 11 includes a central processing unit 1102 ("CPU"), a system memory 1104, including a random-access memory 1106 ("RAM") and a read-only memory ("ROM") 1108, and a system bus 1110 that couples the memory 1104 to the CPU 1102. A basic input/output system containing the basic routines that help to transfer information between elements within the computer architecture 1100, such as during startup, is stored in the ROM 1108. The computer architecture 1100 further includes a mass storage device 1112 for storing an operating system 1112, a user interface platform 105, hosting environment profiles 110, historical configuration data 112, and other data described herein.

The mass storage device 1112 is connected to the CPU 1102 through a mass storage controller (not shown) connected to the system bus 1110. The mass storage device 1112 and its associated computer-readable media provide non-volatile storage for the computer architecture 1100. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media or a computer storage medium may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information, and which can be accessed by the computer architecture 1100. For purposes of the claims, the phrase "non-transitory computer storage media," "computer storage media," "computer-readable storage media" and variations thereof, does not include waves, signals, and/or other transitory and/or intangible communication media, per se.

According to various configurations, the computer architecture 1100 may operate in a networked environment using logical connections to remote computers through the network 1118 and/or another network (not shown in FIG. 11). The computer architecture 1100 may connect to the network 1118 through a network interface unit 1114 connected to the bus 1110. It should be appreciated that the network interface unit 1114 also may be utilized to connect to other types of networks and remote computer systems. The computer architecture 1100 also may include an input/output controller 1116 for receiving and processing input from a number of other devices, including a keyboard, mouse, or electronic stylus (also not shown in FIG. 11). Similarly, the input/output controller 1116 may provide output to a display screen, a printer, or other type of output device (also not shown in FIG. 11).

It should be appreciated that the software components described herein may, when loaded into the CPU 1102 and executed, transform the CPU 1102 and the overall computer architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. The CPU 1102 is one example of a processing unit. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1100 in order to store and execute the software components presented herein. It also should be appreciated that the computer architecture 1100 may include other types of computing devices, including hand-held computers, embedded computer systems, personal digital assistants, and other types of computing devices known to those skilled in the art. It is also contemplated that the computer architecture 1100 may not include all of the components shown in FIG. 11, may include other components that are not explicitly shown in FIG. 11, or may utilize an architecture completely different than that shown in FIG. 11.

Figure 12:
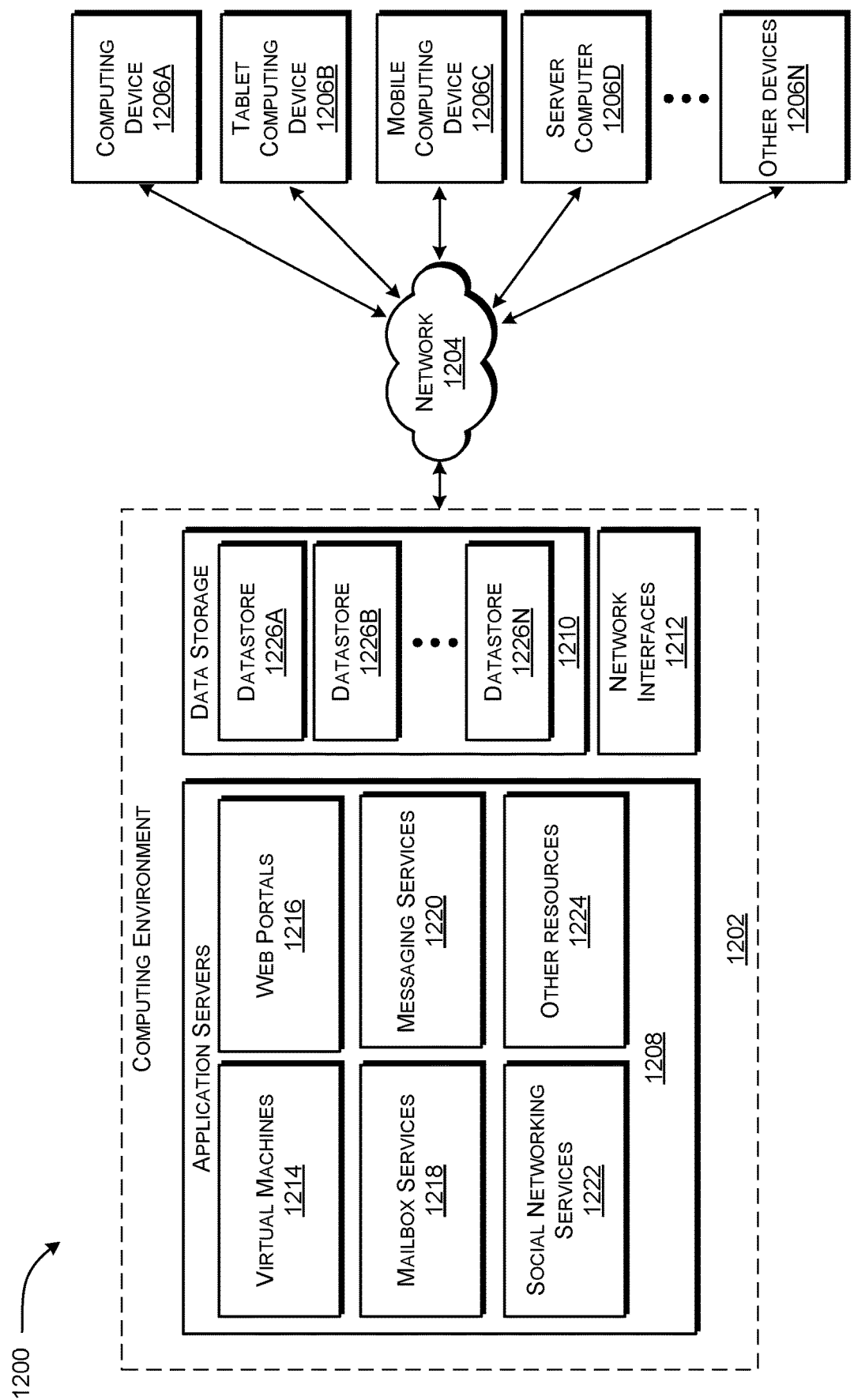
FIG. 12 is a diagram illustrating a distributed computing environment capable of implementing aspects of the techniques and technologies presented herein.

FIG. 12 depicts an illustrative distributed computing environment 1200 capable of executing the software components described herein. Thus, the distributed computing environment 1200 illustrated in FIG. 12 can be utilized to execute any aspects of the software components presented herein. For example, the distributed computing environment 1200 can be utilized to execute aspects of the software components described herein.

According to various implementations, the distributed computing environment 1200 includes a computing environment 1202 operating on, in communication with, or as part of the network 1204. The network 1204 may be or may include the network 1118, described above with reference to FIG. 11. The network 1204 also can include various access networks. One or more client devices 1206A-1206N (hereinafter referred to collectively and/or generically as "clients 1206" and also referred to herein as computing devices 1206) can communicate with the computing environment 1202 via the network 1204 and/or other connections (not illustrated in FIG. 12). In one illustrated configuration, the clients 1206 can include a computing device 1206A such as a laptop computer, a desktop computer, or other computing device; a slate or tablet computing device ("tablet computing device") 1206B; a mobile computing device 1206C such as a mobile telephone, a smart phone, or other mobile computing device; a server computer 1206D; and/or other devices 1206N. It should be understood that any number of clients 1206 can communicate with the computing environment 1202. Two example computing architectures for the clients 1206 are illustrated and described herein. It should be understood that the illustrated clients 1206 and computing architectures illustrated and described herein are illustrative and should not be construed as being limited in any way. The clients can each be a host device or a guest device.

In the illustrated configuration, the computing environment 1202 includes application servers 1208, data storage 1210, and one or more network interfaces 1212. According to various implementations, the functionality of the application servers 1208 can be provided by one or more server computers that are executing as part of, or in communication with, the network 1204. The application servers 1208 can host various services, virtual machines, portals, and/or other resources. In the illustrated configuration, the application servers 1208 host one or more virtual machines 1214 for hosting applications or other functionality. According to various implementations, the virtual machines 1214 host one or more applications and/or software modules for enabling aspects of the present disclosure. It should be understood that this configuration is illustrative and should not be construed as being limiting in any way. The application servers 1208 also host or provide access to one or more portals, link pages, Web sites, and/or other information ("web portals") 1216.

According to various implementations, the application servers 1208 also include one or more mailbox services 1218 and one or more messaging services 1220. The mailbox services 1218 can include electronic mail ("email") services. The mailbox services 1218 also can include various personal information management ("PIM") and presence services including, but not limited to, calendar services, contact management services, collaboration services, and/or other services. The messaging services 1220 can include, but are not limited to, instant messaging services, chat services, forum services, and/or other communication services.

The application servers 1208 also may include one or more social networking services 1222. The social networking services 1222 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 1222 are provided by or include the FACEBOOK social networking service, the LINKEDIN professional networking service, the MYSPACE social networking service, the YAMMER office colleague networking service, and the like. In other configurations, the social networking services 1222 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 1222 also can include commenting, blogging, and/or micro blogging services. Examples of such services include, but are not limited to, the YELP commenting service, the TWITTER messaging service, and/or other services. It should be appreciated that the above lists of services are not exhaustive and that numerous additional and/or alternative social networking services 1222 are not mentioned herein for the sake of brevity. As such, the above configurations are illustrative, and should not be construed as being limited in any way. According to various implementations, the social networking services 1222 may host one or more applications and/or software modules for providing the functionality described herein. For instance, any one of the application servers 1208 may communicate or facilitate the functionality and features described herein. For instance, a social networking application, mail client, messaging client or a browser running on a phone or any other client 1206 may communicate with a social networking service 1222 and facilitate the functionality, even in part, described above with respect to FIG. 12. Any device or service depicted herein can be used as a resource for supplemental data, including email servers, storage servers, etc.

As shown in FIG. 12, the application servers 1208 also can host other services, applications, portals, and/or other resources ("other resources") 1224. The other resources 1224 can include, but are not limited to, document sharing, rendering or any other functionality. It thus can be appreciated that the computing environment 1202 can provide integration of the concepts and technologies disclosed herein with various mailbox, messaging, social networking, and/or other services or resources.

As mentioned above, the computing environment 1202 can include the data storage 1210. According to various implementations, the functionality of the data storage 1210 is provided by one or more databases operating on, or in communication with, the network 1204. The functionality of the data storage 1210 also can be provided by one or more server computers configured to host data for the computing environment 1202. The data storage 1210 can include, host, or provide one or more real or virtual datastores 1226A-1226N (hereinafter referred to collectively and/or generically as "datastores 1226"). The datastores 1226 are configured to host data used or created by the application servers 1208 and/or other data. Although not illustrated in FIG. 12, the datastores 1226 also can host or store web page documents, word documents, presentation documents, data structures, algorithms for execution by a recommendation engine, and/or other data utilized by any application program or another module. Aspects of the datastores 1226 may be associated with a service for storing files.

The computing environment 1202 can communicate with, or be accessed by, the network interfaces 1212. The network interfaces 1212 can include various types of network hardware and software for supporting communications between two or more computing devices including, but not limited to, the computing devices and the servers. It should be appreciated that the network interfaces 1212 also may be utilized to connect to other types of networks and/or computer systems.

It should be understood that the distributed computing environment 1200 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1200 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1200 to utilize the functionality described herein for providing the techniques disclosed herein, among other aspects. In one specific example, as summarized above, techniques described herein may be implemented, at least in part, by web browser application, which works in conjunction with the application servers 1208 of FIG. 12.

Turning now to FIG. 13, an illustrative computing device architecture 1300 for a computing device that is capable of executing various software components described herein for enabling aspects of the present disclosure. The computing device architecture 1300 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1300 is applicable to any of the computing devices shown in FIG. 1. Moreover, aspects of the computing device architecture 1300 may be applicable to traditional desktop computers, portable computers (e.g., phones, laptops, notebooks, ultra-portables, and netbooks), server computers, and other computer systems, such as described herein with reference to FIG. 11. For example, the single touch and multi-touch aspects disclosed herein below may be applied to desktop computers that utilize a touchscreen or some other touch-enabled device, such as a touch-enabled track pad or touch-enabled mouse.

The computing device architecture 1300 illustrated in FIG. 13 includes a processor 1302, memory components 1304, network connectivity components 1306, sensor components 1308, input/output components 1310, and power components 1312. In the illustrated configuration, the processor 1302 is in communication with the memory components 1304, the network connectivity components 1306, the sensor components 1308, the input/output ("I/O") components 1310, and the power components 1312. Although no connections are shown between the individuals components illustrated in FIG. 13, the components can interact to carry out device functions. In some configurations, the components are arranged so as to communicate via one or more busses (not shown in FIG. 13).

The processor 1302 includes a CPU configured to process data, execute computer-executable instructions of one or more application programs, and communicate with other components of the computing device architecture 1300 in order to perform various functionality described herein. The processor 1302 may be utilized to execute aspects of the software components presented herein and, particularly, those that utilize, at least in part, a touch-enabled input.

In some configurations, the processor 1302 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1380P, and higher resolution), video games, 3D modeling applications, and the like. In some configurations, the processor 1302 is configured to communicate with a discrete GPU (also not shown in FIG. 13). In any case, the CPU and GPU may be configured in accordance with a co-processing CPU/GPU computing model, wherein the sequential part of an application executes on the CPU and the computationally-intensive part is accelerated by the GPU.

In some configurations, the processor 1302 is, or is included in, a system-on-chip ("SoC") along with one or more of the other components described herein below. For example, the SoC may include the processor 1302, a GPU, one or more of the network connectivity components 1306, and one or more of the sensor components 1308. In some configurations, the processor 1302 is fabricated, in part, utilizing a package-on-package ("PoP") integrated circuit packaging technique. The processor 1302 may be a single core or multi-core processor.

The processor 1302 may be created in accordance with an ARM architecture, available for license from ARM HOLDINGS of Cambridge, United Kingdom. Alternatively, the processor 1302 may be created in accordance with an x86 architecture, such as is available from INTEL CORPORATION of Mountain View, Calif. and others. In some configurations, the processor 1302 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1304 include a RAM 1314, a ROM 1316, an integrated storage memory ("integrated storage") 1318, and a removable storage memory ("removable storage") 1320. In some configurations, the RAM 1314 or a portion thereof, the ROM 1316 or a portion thereof, and/or some combination of the RAM 1314 and the ROM 1316 is integrated in the processor 1302. In some configurations, the ROM 1316 is configured to store a firmware, an operating system or a portion thereof (e.g., operating system kernel), and/or a bootloader to load an operating system kernel from the integrated storage 1318 and/or the removable storage 1320.

The integrated storage 1318 can include a solid-state memory, a hard disk, or a combination of solid-state memory and a hard disk. The integrated storage 1318 may be soldered or otherwise connected to a logic board upon which the processor 1302 and other components described herein also may be connected. As such, the integrated storage 1318 is integrated in the computing device. The integrated storage 1318 is configured to store an operating system or portions thereof, application programs, data, and other software components described herein.

The removable storage 1320 can include a solid-state memory, a hard disk, or a combination of solid-state memory and a hard disk. In some configurations, the removable storage 1320 is provided in lieu of the integrated storage 1318. In other configurations, the removable storage 1320 is provided as additional optional storage. In some configurations, the removable storage 1320 is logically combined with the integrated storage 1318 such that the total available storage is made available as a total combined storage capacity. In some configurations, the total combined capacity of the integrated storage 1318 and the removable storage 1320 is shown to a user instead of separate storage capacities for the integrated storage 1318 and the removable storage 1320.

The removable storage 1320 is configured to be inserted into a removable storage memory slot (not shown) or other mechanism by which the removable storage 1320 is inserted and secured to facilitate a connection over which the removable storage 1320 can communicate with other components of the computing device, such as the processor 1302. The removable storage 1320 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1304 can store an operating system. According to various configurations, the operating system includes, but is not limited to IOS from Apple Inc. of Cupertino, Calif., and ANDROID OS from Google Inc. of Mountain View, Calif. Other operating systems are contemplated.

The network connectivity components 1306 include a wireless wide area network component ("WWAN component") 1322, a wireless local area network component ("WLAN component") 1324, and a wireless personal area network component ("WPAN component") 1326. The network connectivity components 1306 facilitate communications to and from the network 1356 or another network, which may be a WWAN, a WLAN, or a WPAN. Although only the network 1356 is illustrated, the network connectivity components 1306 may facilitate simultaneous communication with multiple networks, including the network 1118 of FIG. 11. For example, the network connectivity components 1306 may facilitate simultaneous communications with multiple networks via one or more of a WWAN, a WLAN, or a WPAN.

The network 1356 may be or may include a WWAN, such as a mobile telecommunications network utilizing one or more mobile telecommunications technologies to provide voice and/or data services to a computing device utilizing the computing device architecture 1300 via the WWAN component 1322. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1356 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1356 may be configured to provide voice and/or data communications with any combination of the above technologies. The network 1356 may be configured to or adapted to provide voice and/or data communications in accordance with future generation technologies.

In some configurations, the WWAN component 1322 is configured to provide dual-multi-mode connectivity to the network 1356. For example, the WWAN component 1322 may be configured to provide connectivity to the network 1356, wherein the network 1356 provides service via GSM and UMTS technologies, or via some other combination of technologies. Alternatively, multiple WWAN components 1322 may be utilized to perform such functionality, and/or provide additional functionality to support other non-compatible technologies (i.e., incapable of being supported by a single WWAN component). The WWAN component 1322 may facilitate similar connectivity to multiple networks (e.g., a UMTS network and an LTE network).

The network 1356 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1324 is configured to connect to the network 1356 via the WI-FI access points. Such connections may be secured via various encryption technologies including, but not limited to, WI-FI Protected Access ("WPA"), WPA2, Wired Equivalent Privacy ("WEP"), and the like.

The network 1356 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1326 is configured to facilitate communications with other devices, such as peripherals, computers, or other computing devices via the WPAN.

The sensor components 1308 include a magnetometer 1328, an ambient light sensor 1330, a proximity sensor 1332, an accelerometer 1334, a gyroscope 1336, and a Global Positioning System sensor ("GPS sensor") 1338. It is contemplated that other sensors, such as, but not limited to, temperature sensors or shock detection sensors, also may be incorporated in the computing device architecture 1300.

The magnetometer 1328 is configured to measure the strength and direction of a magnetic field. In some configurations the magnetometer 1328 provides measurements to a compass application program stored within one of the memory components 1304 in order to provide a user with accurate directions in a frame of reference including the cardinal directions, north, south, east, and west. Similar measurements may be provided to a navigation application program that includes a compass component. Other uses of measurements obtained by the magnetometer 1328 are contemplated.

The ambient light sensor 1330 is configured to measure ambient light. In some configurations, the ambient light sensor 1330 provides measurements to an application program stored within one the memory components 1304 in order to automatically adjust the brightness of a display (described below) to compensate for low-light and high-light environments. Other uses of measurements obtained by the ambient light sensor 1330 are contemplated.

The proximity sensor 1332 is configured to detect the presence of an object or thing in proximity to the computing device without direct contact. In some configurations, the proximity sensor 1332 detects the presence of a user's body (e.g., the user's face) and provides this information to an application program stored within one of the memory components 1304 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1332 are contemplated.

The accelerometer 1334 is configured to measure proper acceleration. In some configurations, output from the accelerometer 1334 is used by an application program as an input mechanism to control some functionality of the application program. For example, the application program may be a video game in which a character, a portion thereof, or an object is moved or otherwise manipulated in response to input received via the accelerometer 1334. In some configurations, output from the accelerometer 1334 is provided to an application program for use in switching between landscape and portrait modes, calculating coordinate acceleration, or detecting a fall. Other uses of the accelerometer 1334 are contemplated.

The gyroscope 1336 is configured to measure and maintain orientation. In some configurations, output from the gyroscope 1336 is used by an application program as an input mechanism to control some functionality of the application program. For example, the gyroscope 1336 can be used for accurate recognition of movement within a 3D environment of a video game application or some other application. In some configurations, an application program utilizes output from the gyroscope 1336 and the accelerometer 1334 to enhance control of some functionality of the application program. Other uses of the gyroscope 1336 are contemplated.

The GPS sensor 1338 is configured to receive signals from GPS satellites for use in calculating a location. The location calculated by the GPS sensor 1338 may be used by any application program that requires or benefits from location information. For example, the location calculated by the GPS sensor 1338 may be used with a navigation application program to provide directions from the location to a destination or directions from the destination to the location. Moreover, the GPS sensor 1338 may be used to provide location information to an external location-based service, such as E911 service. The GPS sensor 1338 may obtain location information generated via WI-FI, WIMAX, and/or cellular triangulation techniques utilizing one or more of the network connectivity components 1306 to aid the GPS sensor 1338 in obtaining a location fix. The GPS sensor 1338 may also be used in Assisted GPS ("A-GPS") systems. The GPS sensor 1338 can also operate in conjunction with other components, such as the processor 1302, to generate positioning data for the computing device 1300.

The I/O components 1310 include a display 1340, a touchscreen 1342, a data I/O interface component ("data I/O") 1344, an audio I/O interface component ("audio I/O") 1346, a video I/O interface component ("video I/O") 1348, and a camera 1350. In some configurations, the display 1340 and the touchscreen 1342 are combined. In some configurations, two or more of the data I/O component 1344, the audio I/O component 1346, and the video I/O component 1348 are combined. The I/O components 1310 may include discrete processors configured to support the various interface described below or may include processing functionality built-in to the processor 1302.

The display 1340 is an output device configured to present information in a visual form. In particular, the display 1340 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1340 is a liquid crystal display ("LCD") utilizing any active or passive matrix technology and any backlighting technology (if used). In some configurations, the display 1340 is an organic light emitting diode ("OLED") display. Other display types are contemplated.

The touchscreen 1342, also referred to herein as a "touch-enabled screen," is an input device configured to detect the presence and location of a touch. The touchscreen 1342 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1342 is incorporated on top of the display 1340 as a transparent layer to enable a user to use one or more touches to interact with objects or other information presented on the display 1340. In other configurations, the touchscreen 1342 is a touch pad incorporated on a surface of the computing device that does not include the display 1340. For example, the computing device may have a touchscreen incorporated on top of the display 1340 and a touch pad on a surface opposite the display 1340.

In some configurations, the touchscreen 1342 is a single-touch touchscreen. In other configurations, the touchscreen 1342 is a multi-touch touchscreen. In some configurations, the touchscreen 1342 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1342. As such, a developer may create gestures that are specific to a particular application program.

In some configurations, the touchscreen 1342 supports a tap gesture in which a user taps the touchscreen 1342 once on an item presented on the display 1340. The tap gesture may be used for various reasons including, but not limited to, opening or launching whatever the user taps. In some configurations, the touchscreen 1342 supports a double tap gesture in which a user taps the touchscreen 1342 twice on an item presented on the display 1340. The double tap gesture may be used for various reasons including, but not limited to, zooming in or zooming out in stages. In some configurations, the touchscreen 1342 supports a tap and hold gesture in which a user taps the touchscreen 1342 and maintains contact for at least a pre-defined time. The tap and hold gesture may be used for various reasons including, but not limited to, opening a context-specific menu.

In some configurations, the touchscreen 1342 supports a pan gesture in which a user places a finger on the touchscreen 1342 and maintains contact with the touchscreen 1342 while moving the finger on the touchscreen 1342. The pan gesture may be used for various reasons including, but not limited to, moving through screens, images, or menus at a controlled rate. Multiple finger pan gestures are also contemplated. In some configurations, the touchscreen 1342 supports a flick gesture in which a user swipes a finger in the direction the user wants the screen to move. The flick gesture may be used for various reasons including, but not limited to, scrolling horizontally or vertically through menus or pages. In some configurations, the touchscreen 1342 supports a pinch and stretch gesture in which a user makes a pinching motion with two fingers (e.g., thumb and forefinger) on the touchscreen 1342 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 1342. As such, the above gestures should be understood as being illustrative and should not be construed as being limiting in any way.

The data I/O interface component 1344 is configured to facilitate input of data to the computing device and output of data from the computing device. In some configurations, the data I/O interface component 1344 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1346 is configured to provide audio input and/or output capabilities to the computing device. In some configurations, the audio I/O interface component 1346 includes a microphone configured to collect audio signals. In some configurations, the audio I/O interface component 1346 includes a headphone jack configured to provide connectivity for headphones or other external speakers. In some configurations, the audio I/O interface component 1346 includes a speaker for the output of audio signals. In some configurations, the audio I/O interface component 1346 includes an optical audio cable out.

The video I/O interface component 1348 is configured to provide video input and/or output capabilities to the computing device. In some configurations, the video I/O interface component 1348 includes a video connector configured to receive video as input from another device (e.g., a video media player such as a DVD or BLURAY player) or send video as output to another device (e.g., a monitor, a television, or some other external display). In some configurations, the video I/O interface component 1348 includes a High-Definition Multimedia Interface ("HDMI"), mini-HDMI, micro-HDMI, DisplayPort, or proprietary connector to input/output video content. In some configurations, the video I/O interface component 1348 or portions thereof is combined with the audio I/O interface component 1346 or portions thereof.

The camera 1350 can be configured to capture still images and/or video. The camera 1350 may utilize a charge coupled device ("CCD") or a complementary metal oxide semiconductor ("CMOS") image sensor to capture images. In some configurations, the camera 1350 includes a flash to aid in taking pictures in low-light environments. Settings for the camera 1350 may be implemented as hardware or software buttons.

Although not illustrated, one or more hardware buttons may also be included in the computing device architecture 1300. The hardware buttons may be used for controlling some operational aspect of the computing device. The hardware buttons may be dedicated buttons or multi-use buttons. The hardware buttons may be mechanical or sensor-based.

The illustrated power components 1312 include one or more batteries 1352, which can be connected to a battery gauge 1354. The batteries 1352 may be rechargeable or disposable. Rechargeable battery types include, but are not limited to, lithium polymer, lithium ion, nickel cadmium, and nickel metal hydride. Each of the batteries 1352 may be made of one or more cells.

The battery gauge 1354 can be configured to measure battery parameters such as current, voltage, and temperature. In some configurations, the battery gauge 1354 is configured to measure the effect of a battery's discharge rate, temperature, age and other factors to predict remaining life within a certain percentage of error. In some configurations, the battery gauge 1354 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1312 may also include a power connector, which may be combined with one or more of the aforementioned I/O components 1310. The power components 1312 may interface with an external power system or charging equipment via an I/O component.

The alignment and position of the second computing device can be detected by the use of a number of different types of sensors. For example, RF sensors, optical proximity sensors, and location sensors (Wi-Fi, GPS, etc.) can be utilized. In some embodiments, cameras RF sensors, optical proximity sensors, location sensors, feedback sensors, vibration sensors, or any other suitable sensor can be used to determine when a user has tapped (i.e., touched) a display surface of a computing device.

The terms "a," "an," "the" and similar referents used in the context of describing the invention including in the following claims are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two computing devices, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and are not to be construed as limiting the scope of the claims.

The invention claimed is:

1. A method for managing a user interface object displayed by a computing device, the method comprising:
    detecting a specific number of display devices in a hosting environment of the computing device, wherein the hosting environment provides a graphical user interface (GUI) and is characterized by a display device topology and an attribute of one or more of the display devices;
    from a plurality of hosting environment profiles each including parameters specifying specific numbers of display devices and a display attribute, selecting a hosting environment profile based on comparison of a specific number of display devices specified in the hosting environment profile to the specific number of display devices in the hosting environment;
    identifying historical configuration data linked to the hosting environment profile, the historical configuration data specifying a state of the user interface object associated with a previous manipulation of the user interface object by a user, the state defining at least in part how the user interface object is to be rendered in the GUI;
    determining an additional rule is applicable to the state of the user interface object, wherein the additional rule is separate from the plurality of hosting environment profiles; and
    configuring an appearance of the user interface object to be rendered in the GUI based on the state of the user interface object specified by the historical configuration data and the additional rule.

2. The method of claim 1, wherein the user interface object is a window, an icon, a menu, a web page element, or a browser icon.

3. The method of claim 1, wherein the display device topology indicates a display device type for each of the display devices.

4. The method of claim 1, wherein at least one of the display devices is a monitor, a 2D display, a 3D display, a holographic display, a virtual reality headset, an augmented reality headset, or a virtual monitor.

5. The method of claim 1, wherein the attribute of the one or more of the display devices is size, resolution, refresh rate, color space, orientation, input capability, audio output capability, or hardware identifier.

6. The method of claim 1, wherein the state of the user interface object describes at least one of: size, position, maximized status, minimized status, or restore location.

7. The method of claim 1, wherein the plurality of hosting environment profiles and the linked historical configuration data are stored in persistent memory.

8. The method of claim 1, wherein the comparison comprises determining that the specific number of display devices or the attribute of the one or more of the display devices in the hosting environment is within a threshold amount of a value for data in the hosting environment profile specifying the specific number of display devices or the attribute of the one or more of the display devices.

9. The method of claim 1, the additional rule specifies rendering the user interface object with a same state as the user interface object was rendered previously in the hosting environment.

10. The method of claim 1, further comprising:
receiving input data from an action of the user indicating a change to the rendering of the user interface object to a second state; and
modifying the historical configuration data to specify the second state for the user interface object.

11. The method of claim 1, further comprising:
detecting a change of the hosting environment to a different hosting environment based on a change in the specific number of display devices to a new number of display devices or a change in a value of the attribute of the one or more of the display devices to a new value of the attribute;
determining that none of the plurality of hosting environment profiles correspond to the different hosting environment;
creating a new hosting environment profile characterized by the new number of display devices or the new value of the attribute; and
adding the new hosting environment profile to the plurality of hosting environment profiles.

12. The method of claim 1, further comprising:
detecting a change of the hosting environment to a second hosting environment based on a change in the specific number of display devices to a second number of display devices or in a value of the attribute of the one or more of the display devices to a second value for the attribute;
from the plurality of hosting environment profiles, selecting a second hosting environment profile based on comparison of the specific number of display devices or the attribute of the one or more of the display devices specified in the second hosting environment profile to the second number of display devices or the second value for the attribute of the one or more of the display devices of the hosting environment;
identifying second historical configuration data linked to the second hosting environment profile, the second historical configuration data specifying a second state of
the user interface object, the second state defining how the user interface object is
rendered in the GUI; and
changing the appearance of the rendering of the user interface object based on the second state of the user interface object specified by the second historical configuration data.

13. A computing device comprising:
a processing unit; and
memory coupled to the processing unit, the memory comprising computer-executable instructions that, when executed by the processing unit, perform operations to:
detect a specific number of display devices in a hosting environment of the computing device, wherein the hosting environment provides a graphical user interface (GUI) and is characterized by a display device topology and an attribute of one or more of the display devices;
from a plurality of hosting environment profiles each including data specifying specific numbers of display devices and a display attribute, selecting a hosting environment profile based on comparison of a specific number of display devices specified in the hosting environment profile to the specific number of display devices in the hosting environment;
identify historical configuration data linked to the hosting environment profile, the historical configuration data specifying a state of a user interface object associated with a previous manipulation of the user interface object by a user, the state defining how the user interface object is to be rendered in the GUI;
determine that an additional rule is applicable to the state of the user interface object, wherein the additional rule is separate from the plurality of hosting environment profiles; and
configure an appearance of the rendering of the user interface object to be rendered in the GUI based on the state of the user interface object in the historical configuration data and the additional rule.

14. The computing device of claim 13, wherein the user interface object is a window, an icon, a browser icon, a menu, or a web page element and the attribute of the one or more of the display devices is size, resolution, refresh rate, color space, orientation, input capability, audio output capability, or hardware identifier.

15. The computing device of claim 13, wherein:
the hosting environment comprises a display device topology;
the attribute of the one or more of the display devices is size, resolution, or orientation;
the user interface object comprises a window; and
the state of the user interface object is size or position.

16. The computing device of claim 13, wherein the computer-executable instructions further cause the processing unit to configure the appearance of the rendering of the user interface object based additionally on configuration data provided by a user interface platform operating on the computing device.

17. A computer-readable storage medium having encoded thereon computer-executable instructions to cause one or more processing units of a computing device to:
- detect a specific number of display devices in a hosting environment of the computing device, wherein the hosting environment provides a graphical user interface (GUI) and is characterized by a display device topology and an attribute of one or more of the display devices;
- determine that none of a plurality of hosting environments profiles correspond to the hosting environment;
- create a new hosting environment profile characterized by the specific number of display devices or the attribute of the one or more of the display devices;
- add the new hosting environment profile to the plurality of hosting environment profiles;
- display a rendering of a user interface object on the display devices;
- receive input data from an action of a user indicating a change to the rendering of the user interface object;
- retain a state of the user interface object as historical configuration data, the state defining at least in part how the user interface object is rendered in the GUI; and
- link the historical configuration data to the new hosting environment profile.

18. The computer-readable storage medium of claim 17, wherein the computer-executable instructions further cause the one or more processing units of the computing device to store the new hosting environment profile and the historical configuration data in persistent memory.

19. The computer-readable storage medium of claim 17, wherein the user interface object is one of a window, an icon, a menu, a web page element, or a browser icon.

20. The computer-readable storage medium of claim 17, wherein the computer-executable instructions further cause the one or more processing units of the computing device to:
- detect a change of the hosting environment of the computing device from a first hosting environment to a second hosting environment;
- determine that the second hosting environment corresponds to the new hosting environment profile; and
- modify the rendering of the user interface object based on the state of the user interface object retained in the historical configuration data.

* * * * *